US011842509B2

(12) United States Patent
Tate

(10) Patent No.: US 11,842,509 B2
(45) Date of Patent: Dec. 12, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shunta Tate, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 259 days.

(21) Appl. No.: 17/122,958

(22) Filed: Dec. 15, 2020

(65) Prior Publication Data

US 2021/0192772 A1 Jun. 24, 2021

(30) Foreign Application Priority Data

Dec. 24, 2019 (JP) ................................ 2019-233229

(51) Int. Cl.
*G06T 7/70* (2017.01)
*G06N 3/08* (2023.01)
(Continued)

(52) U.S. Cl.
CPC .............. *G06T 7/70* (2017.01); *G06F 18/213* (2023.01); *G06N 3/08* (2013.01); *G06V 10/764* (2022.01);
(Continued)

(58) Field of Classification Search
CPC ............ G06N 20/00; G06N 3/08; G06N 3/02; G06N 3/084; G06N 3/04; G06N 3/0445;
(Continued)

(56) References Cited

U.S. PATENT DOCUMENTS 10,740,647 B2 * 8/2020 Du ....................... G06V 10/454
10,803,357 B2 * 10/2020 Yasutomi ............... G06K 9/628
(Continued)

FOREIGN PATENT DOCUMENTS

CN 107609536 A * 1/2018 ......... G06K 9/00255
CN 109829501 A * 5/2019 ........... G06K 9/2054
(Continued)

OTHER PUBLICATIONS

Joseph Redmon et al.; "YOLO9000: Better, Faster, Stronger;" University of Washington, Allen Institute for AI; ICCV Dec. 25, 2016; pp. 1-9.
(Continued)

*Primary Examiner* — Ian L Lemieux
*Assistant Examiner* — Woo C Rhim
(74) *Attorney, Agent, or Firm* — CANON U.S.A., INC. IP Division

(57) ABSTRACT

An apparatus includes a first acquisition unit that acquires a plurality of likelihood maps by setting a plurality of different weight parameters in a trained model that outputs, with an image feature extracted from the input image as an input, a likelihood map including, in association with a position in the input image, a likelihood indicating a possibility that the object is present, and a detection unit that detects, based on the acquired plurality of the likelihood maps, the position of the object included in the input image, wherein the trained model is a model that has learned the weight parameters based on loss values at least acquired using a first loss function for reducing a likelihood around a position of interest in the likelihood map, and a second loss function for increasing a likelihood acquired at the position of the object in the input image.

19 Claims, 21 Drawing Sheets

(51) Int. Cl.
*G06V 40/10* (2022.01)
*G06F 18/213* (2023.01)
*G06V 10/764* (2022.01)
*G06V 10/82* (2022.01)
*G06V 40/16* (2022.01)

(52) U.S. Cl.
CPC .............. *G06V 10/82* (2022.01); *G06V 40/10* (2022.01); *G06V 40/172* (2022.01); *G06T 2207/20081* (2013.01); *G06T 2207/20084* (2013.01)

(58) Field of Classification Search
CPC .... G06N 3/0454; G06V 10/70; G06V 10/764; G06V 10/765; G06V 10/82; G06V 10/454; G06V 30/194; G06V 10/84; G06V 10/24; G06V 20/40; G06V 10/23; G06V 10/22; G06V 40/10; G06V 40/16; G06V 40/161; G06V 40/168; G06V 40/172; G06V 40/103; G06V 10/255; G06V 10/759; G06V 30/19; G06V 20/56; B60R 21/01552; B60R 1/00; B60R 2300/301; B60R 2300/8033; G06T 2207/30196; G06T 2207/30242; G06T 7/11; G06T 7/60; G06T 7/62; G06T 7/66; G06T 2207/30236; G06T 2207/30261; G06T 2207/30252

See application file for complete search history.

(56) References Cited

U.S. PATENT DOCUMENTS

| | | | |
|---|---|---|---|
| 11,256,955 B2* | 2/2022 | Tate | G06T 7/70 |
| 11,455,782 B2* | 9/2022 | Li | G06K 9/6267 |
| 2012/0008831 A1* | 1/2012 | Tanigawa | G01B 11/002 382/103 |
| 2017/0083796 A1* | 3/2017 | Kim | G06V 40/103 |
| 2018/0165813 A1* | 6/2018 | Mai | G06T 7/11 |
| 2018/0205877 A1* | 7/2018 | Yano | G06V 10/50 |
| 2018/0253629 A1* | 9/2018 | Bamba | G06V 10/22 |
| 2019/0050694 A1* | 2/2019 | Fukagai | G06T 7/74 |
| 2019/0050994 A1* | 2/2019 | Fukagai | G06F 18/24 |
| 2019/0172224 A1* | 6/2019 | Vajda | G06N 3/0454 |
| 2019/0244028 A1* | 8/2019 | Jones | G06T 7/74 |
| 2020/0151488 A1* | 5/2020 | Suzuki | G06V 10/764 |
| 2020/0193628 A1* | 6/2020 | Chakraborty | G06T 7/70 |
| 2020/0226786 A1* | 7/2020 | Fitzgibbon | G06N 5/003 |
| 2020/0364517 A1* | 11/2020 | Nakata | G06N 3/045 |
| 2020/0410273 A1* | 12/2020 | Miao | G06V 10/255 |
| 2021/0089794 A1* | 3/2021 | Chen | G06V 10/42 |
| 2021/0133474 A1* | 5/2021 | Sawada | G06K 9/6293 |
| 2021/0142512 A1* | 5/2021 | Ando | G06K 9/6232 |
| 2021/0158566 A1* | 5/2021 | Ogawa | G06K 9/6232 |
| 2021/0192242 A1* | 6/2021 | Kudo | G06T 7/00 |
| 2021/0209396 A1* | 7/2021 | Miyano | G06F 18/2415 |
| 2022/0108544 A1* | 4/2022 | Becker | G06T 7/73 |

FOREIGN PATENT DOCUMENTS

| | | | | |
|---|---|---|---|---|
| CN | 110009611 A | * | 7/2019 | ........... G06T 7/0004 |
| CN | 110163197 A | * | 8/2019 | ......... G06K 9/00201 |
| CN | 110245662 A | * | 9/2019 | ........... G06K 9/2054 |
| CN | 112541395 A | * | 3/2021 | ........... G06K 9/0063 |
| DE | 102018116111 A1 | * | 1/2019 | ......... G06K 9/00711 |
| EP | 3223035 A1 | * | 9/2017 | ............ G01S 17/89 |
| JP | 2005134949 A | * | 5/2005 | |
| JP | 2007240295 A | * | 9/2007 | |
| JP | 5687082 B2 | * | 3/2015 | |
| JP | 2019139618 A | * | 8/2019 | |
| JP | 2020027405 A | * | 2/2020 | |
| JP | 2020087463 A | * | 6/2020 | ........... G06K 9/3241 |
| WO | WO-2021260780 A1 | * | 12/2021 | |

OTHER PUBLICATIONS

Alex Krizhevsky, et al.; "ImageNet Classification with Deep Convolutional Neural Networks;" University of Toronto; NIPS, 2012; pp. 1-9.
Matthew D. Zeiler, et al.; "Visualizing and Understanding Convolutional Networks;" Dept. of Computer Science, New York University, USA; ECCV 2014, Part I, LNCS 8689, pp. 818-833.
Emmanouil Z. Psarakis et al.; "An Enhanced Correlation-Based Method for Stereo Correspondence with Sub-Pixel Accuracy;" Department of Computer Engineering and Informatics; ICCV, 2005; pp. 1-6.
Y. Le Cun, et al.; "Handwritten Digit Recognition with a Back-Propagation Network;" AT & T Bell Laboratories, N.J. 07733; NIPS, 1990; pp. 1-9.
Kaiming He et al,; "Mask R-CNN;" Facebook AI Research (FAIR); ICCV; Jan. 24, 2018; pp. 1-12.

* cited by examiner

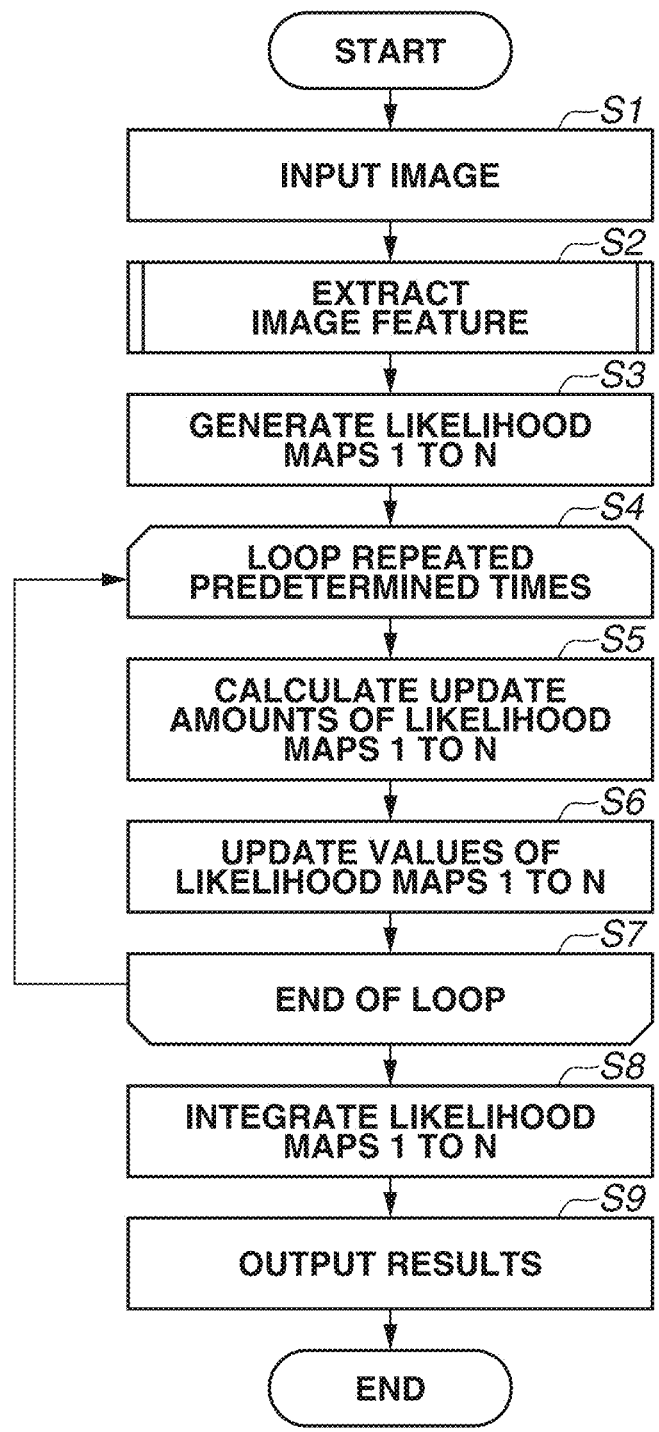

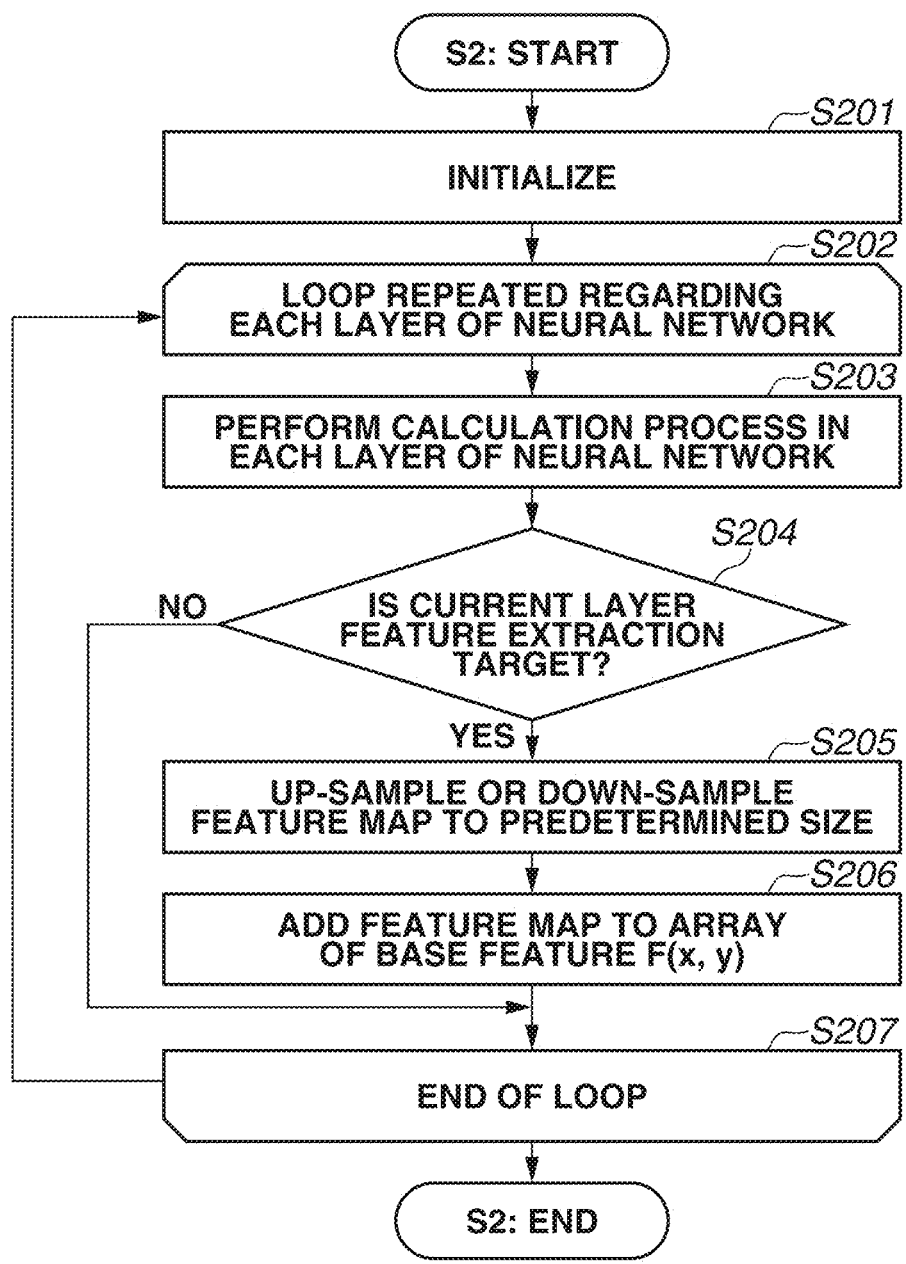

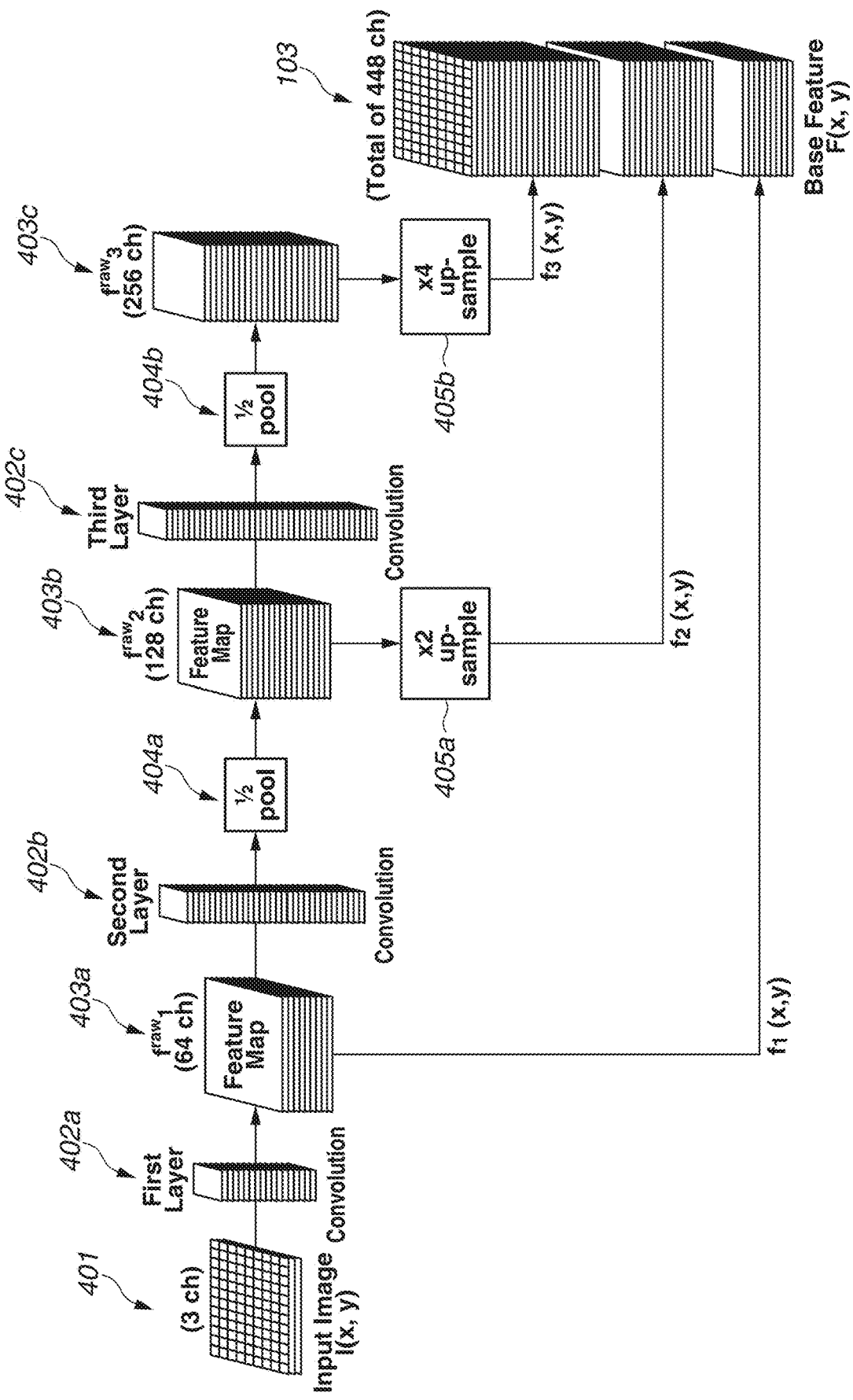

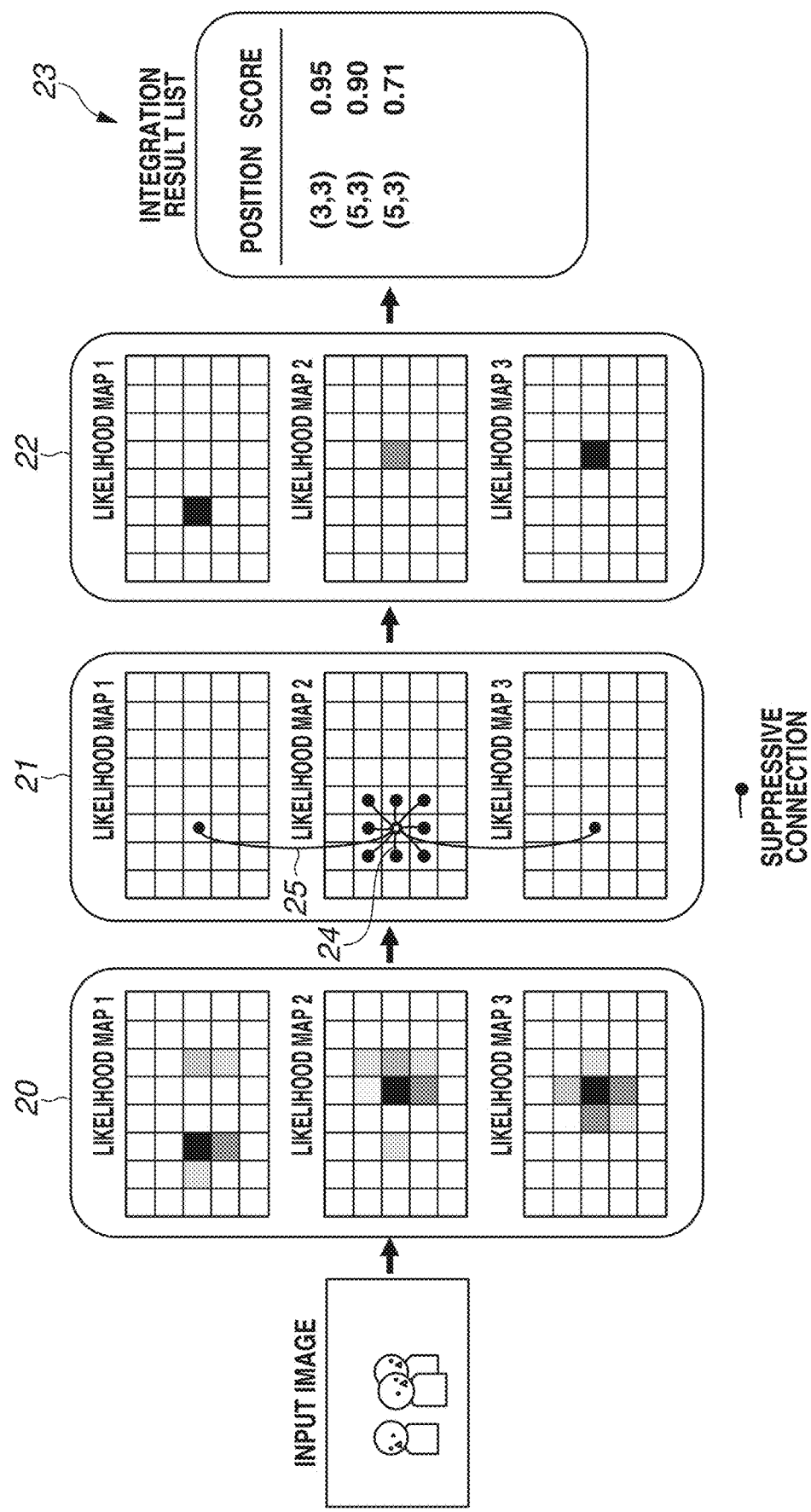

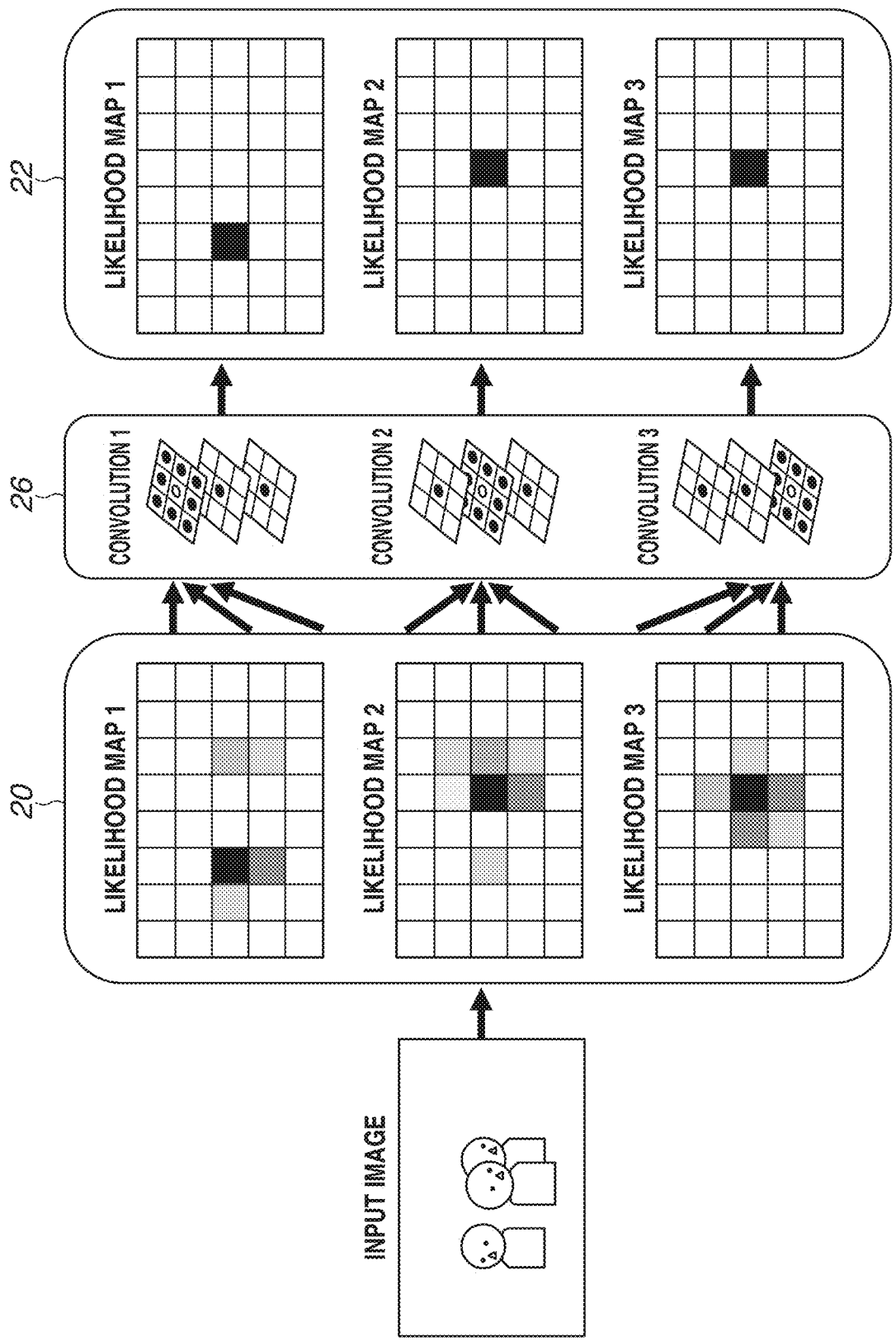

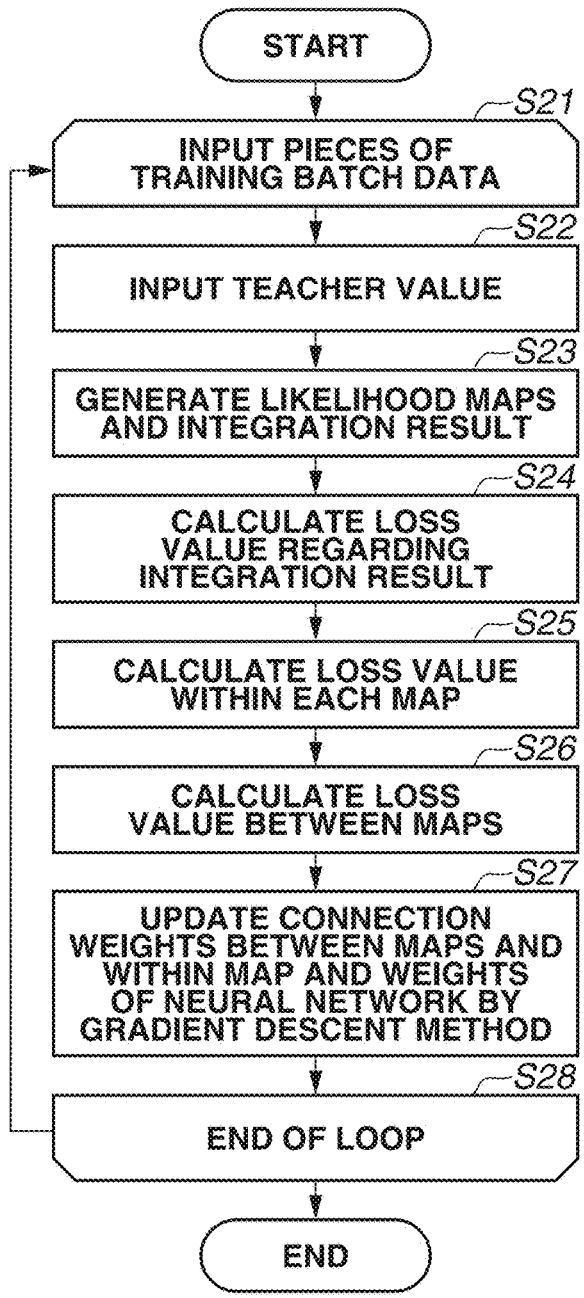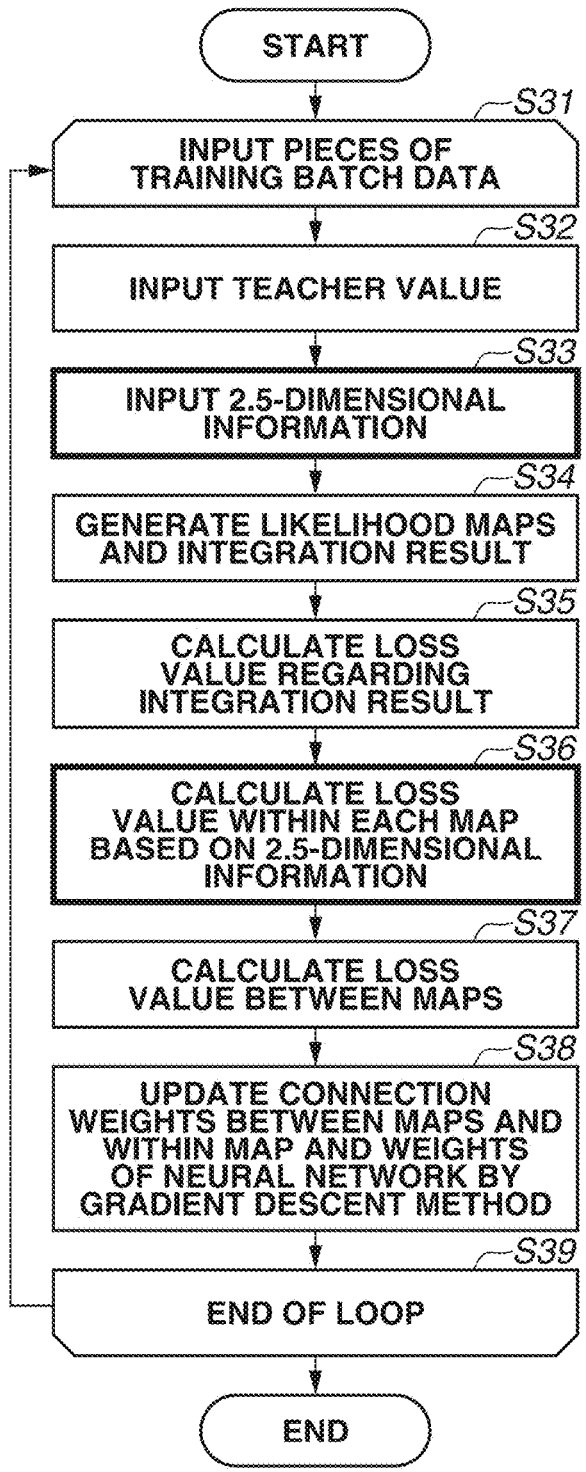

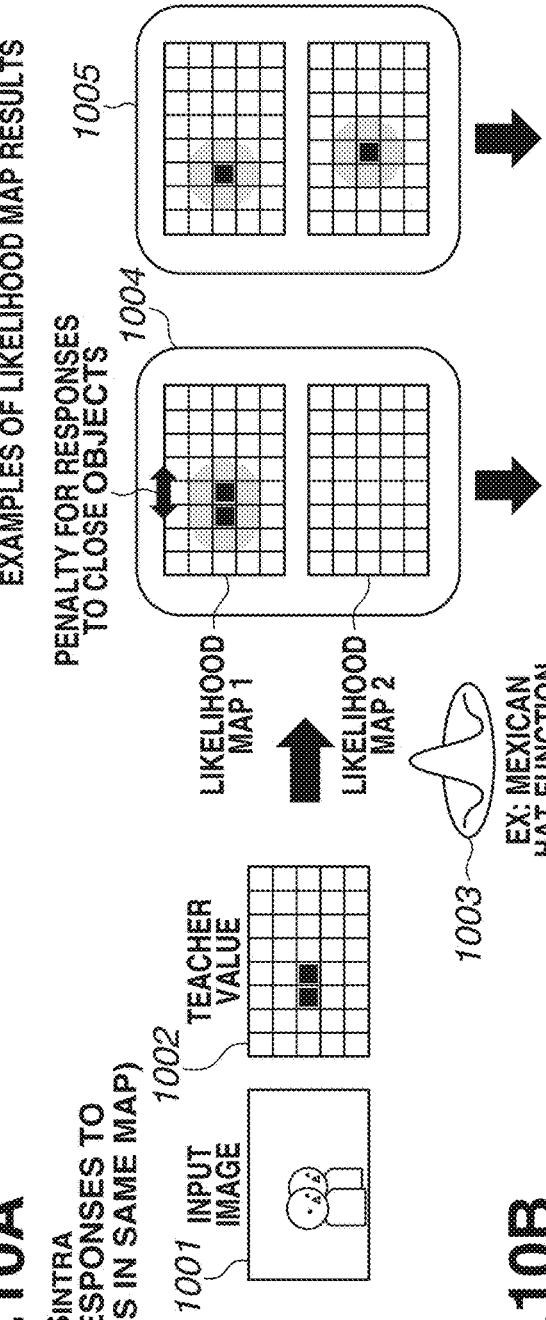
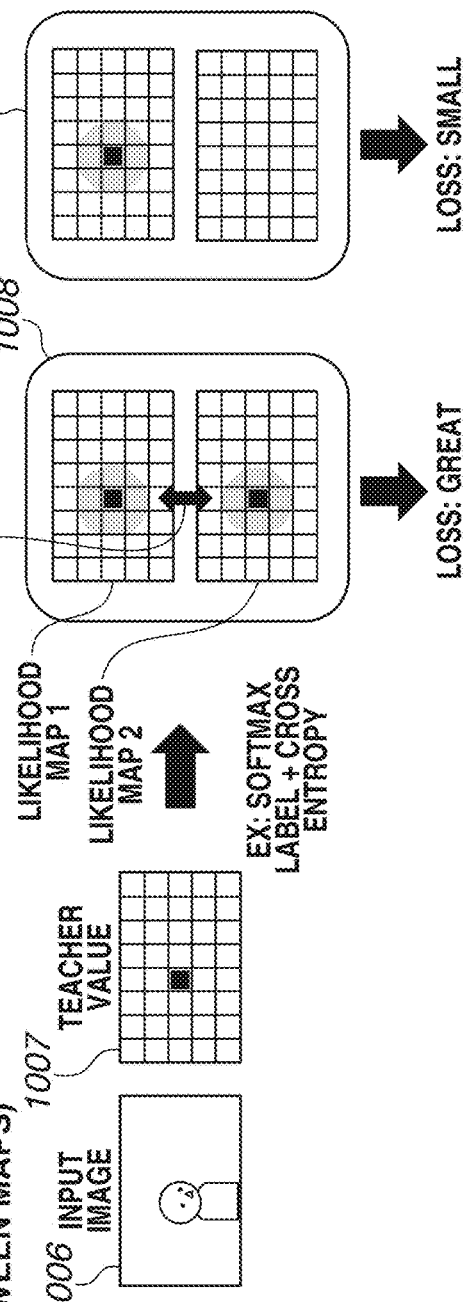

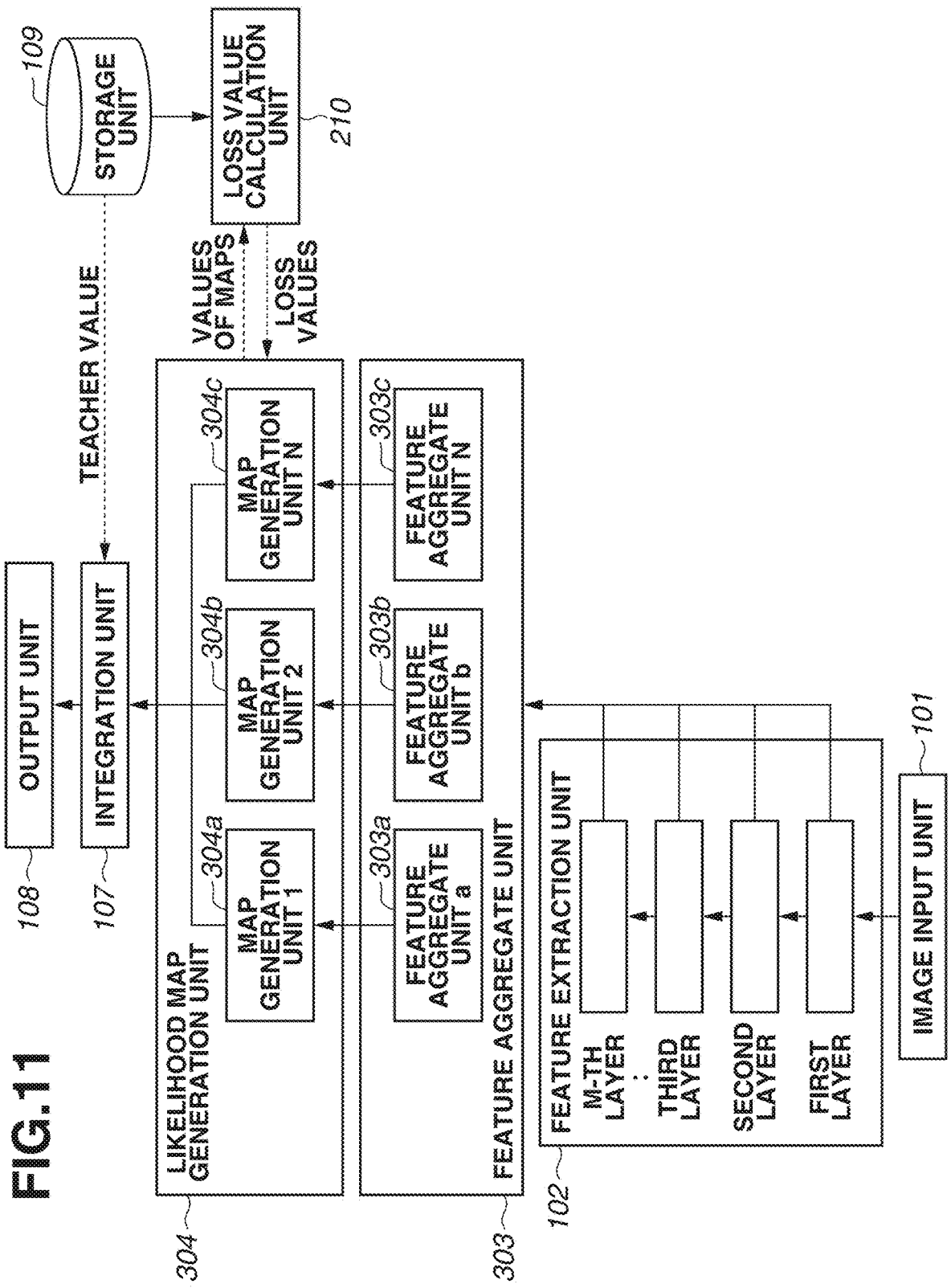

FIG.17
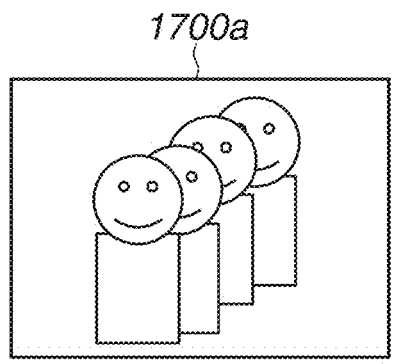
1700a
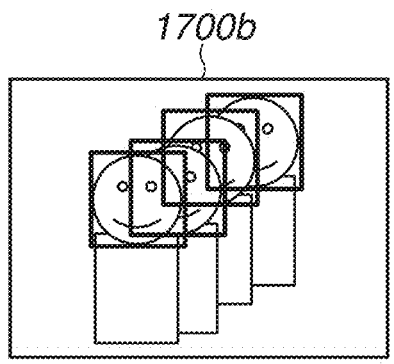
1700b
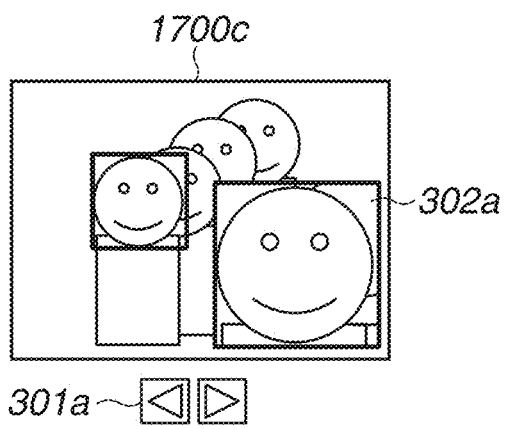
1700c
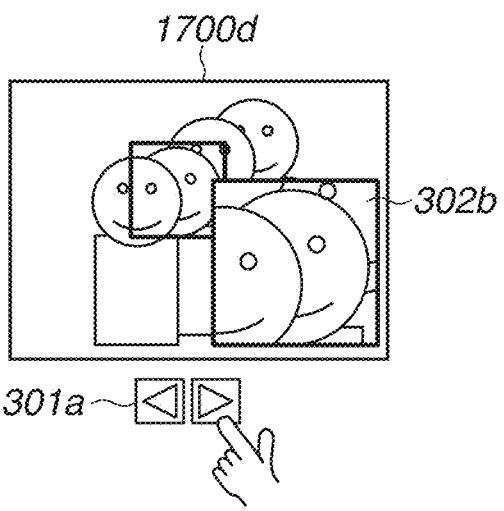
1700d
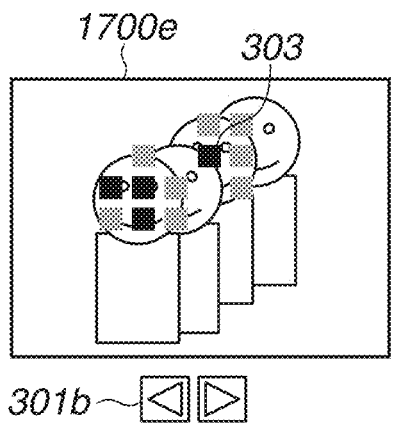
1700e
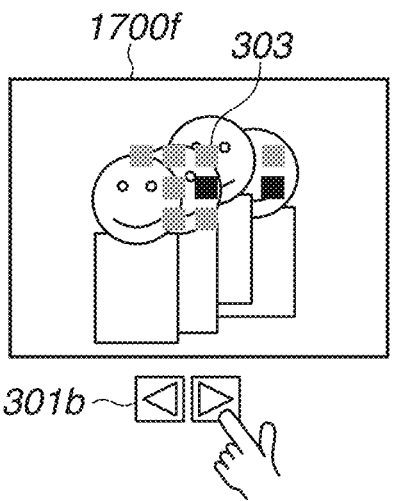
1700f

INFORMATION PROCESSING APPARATUS, INFORMATION PROCESSING METHOD, AND STORAGE MEDIUM

BACKGROUND OF THE DISCLOSURE

Field of the Disclosure

The aspect of the embodiments relates to a technique for recognizing a plurality of target objects in an image.

Description of the Related Art

Conventionally, a method for detecting a particular object in an image is known. For example, J. Redmon, A. Farhadi, YOLO9000: Better, Faster, Stronger, CVPR, 2017 discusses a technique for recognizing a position, a size, and a category of an object using a neural network. A technique similar to that in J. Redmon, A. Farhadi, YOLO9000: Better, Faster, Stronger, CVPR, 2017 processes an input image using a multi-layer neural network (also referred to as a "deep neural network", hereinafter abbreviated as "DNN"). The general form of these techniques is as follows. First, an input image is converted into a size of W×H and input to a DNN. Next, the input image is subjected to a calculation such as convolution a plurality of times, thereby intermediately converting the image into an image feature having a resolution of w×h (w≤W, h≤H). In a subsequent layer of the DNN, it is determined whether a target object is present at each position in w×h of this feature. If it is determined that the target object is present, the detection result is further output together with the size of the target object and an accurate position estimation result, which are separately estimated by the DNN.

Conventionally, in a case where a plurality of objects of the same type is present adjacent to each other in a single block as a unit for determining the presence or absence of an object, it may be erroneously detected that "a single object is present". In other words, it is difficult to separately recognize objects of the same type close to each other.

SUMMARY OF THE DISCLOSURE

According to an aspect of the embodiments, an apparatus that detects a position of an object included in an input image, includes a first acquisition unit configured to acquire a plurality of likelihood maps by setting a plurality of different weight parameters in a trained model that outputs, with an image feature extracted from the input image as an input, a likelihood map including, in association with a position in the input image, a likelihood indicating a possibility that the object is present, and a detection unit configured to detect, based on the acquired plurality of the likelihood maps, the position of the object included in the input image, wherein the trained model learns the weight parameters based on loss values at least acquired using a first loss function for reducing a likelihood around a position of interest in the likelihood map, and a second loss function for increasing a likelihood acquired at the position of the object in the input image.

Further features of the disclosure will become apparent from the following description of exemplary embodiments with reference to the attached drawings.

BRIEF DESCRIPTION OF THE DRAWINGS

FIG. 2 is a flowchart illustrating processing executed by the information processing apparatus.

FIG. 3 is a flowchart illustrating processing executed by a feature extraction unit.

FIG. 4 is a schematic diagram of an image feature.

FIG. 5 is a schematic diagram of updates and integration of likelihood maps.

FIG. 7 is a diagram conceptually illustrating connection weights of the likelihood maps.

FIGS. 9A and 9B are flowcharts each illustrating processing executed by the information processing apparatus.

FIGS. 10A and 10B are diagrams schematically illustrating loss functions.

FIG. 11 is a block diagram illustrating an example of a functional configuration of an information processing apparatus.

FIG. 17 is a diagram illustrating examples of a graphical user interface (GUI).

DESCRIPTION OF THE EMBODIMENTS

In a first exemplary embodiment, a description is given of a technique for, even in a case where a plurality of objects is located close to or overlaps each other in object detection, robustly detecting the objects. Here, an example of an information processing apparatus that detects a face of each object is described. However, the aspect of the embodiments is applicable not only to the detection of the face of each object, but also to various types of object detection. Although the following descriptions are given of a method for calculating a position of each object in an input image and a likelihood at each position in the image, a position in the image may be replaced with a region.

In a case where each of a plurality of objects included in an image is detected, and if the objects are adjacent to each other, the objects may be detected as a single object, or one of the objects may not be detected. In such a case, in the present exemplary embodiment, two or more likelihood maps are prepared in each of which a likelihood indicating the possibility that an object is present is associated with each region (position) in an input image. Then, the position of the object is detected from the plurality of likelihood maps. To detect objects present at different positions, the plurality of likelihood maps, using loss functions or connections between neurons, learns weight parameters within a likelihood map or between likelihood maps or updates likelihoods obtained using the likelihood maps.

Figure 1:
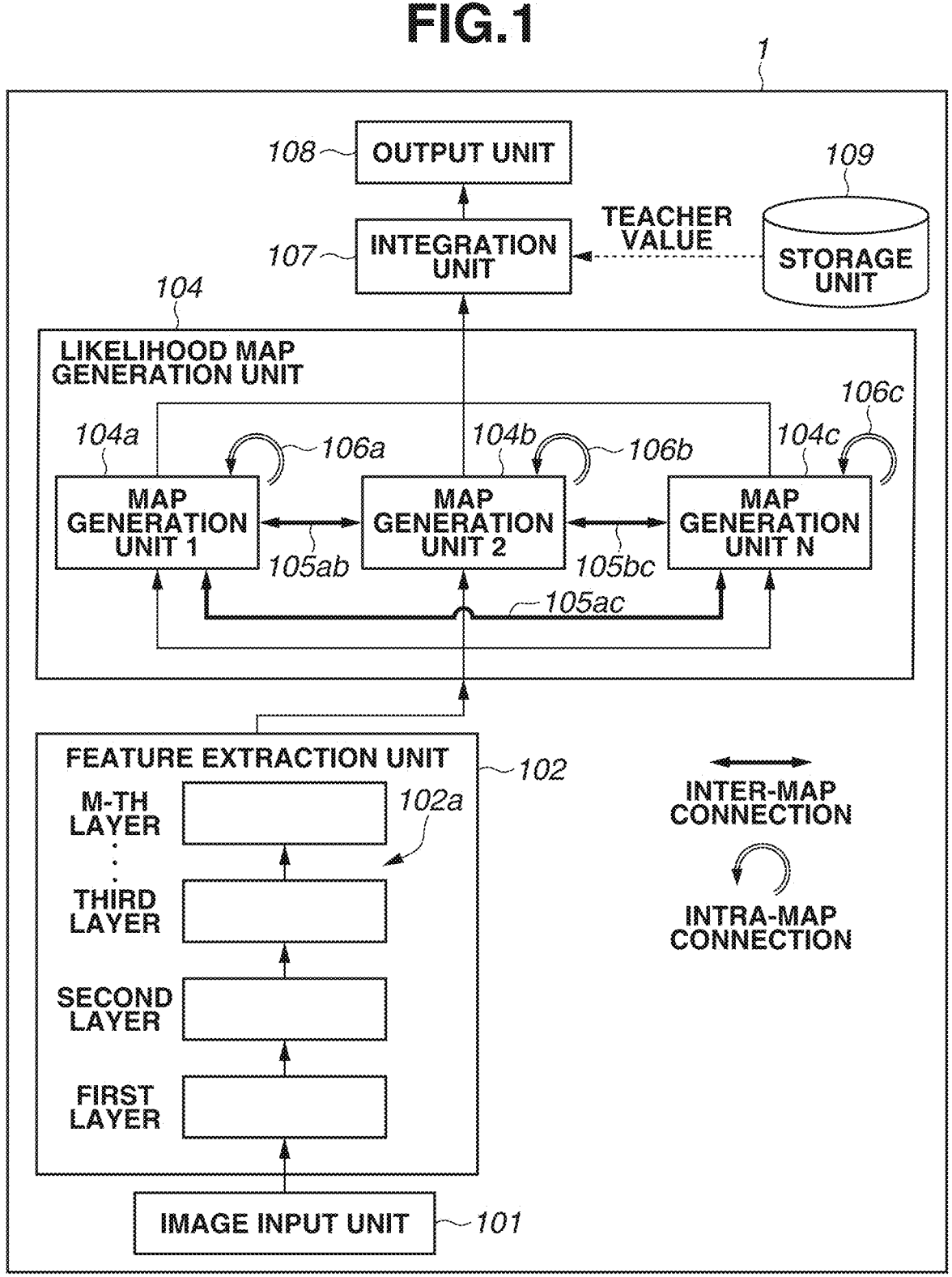
FIG. 1 is a block diagram illustrating an example of a functional configuration of an information processing apparatus.

With reference to FIG. 1, a description is given. FIG. 1 is a basic functional configuration diagram of the disclosure. Hereinafter, in a description with reference to the drawings, the same sign among the drawings means the same component module. Unless there is a noteworthy difference, the same component module is not redundantly described.

Figure 21:
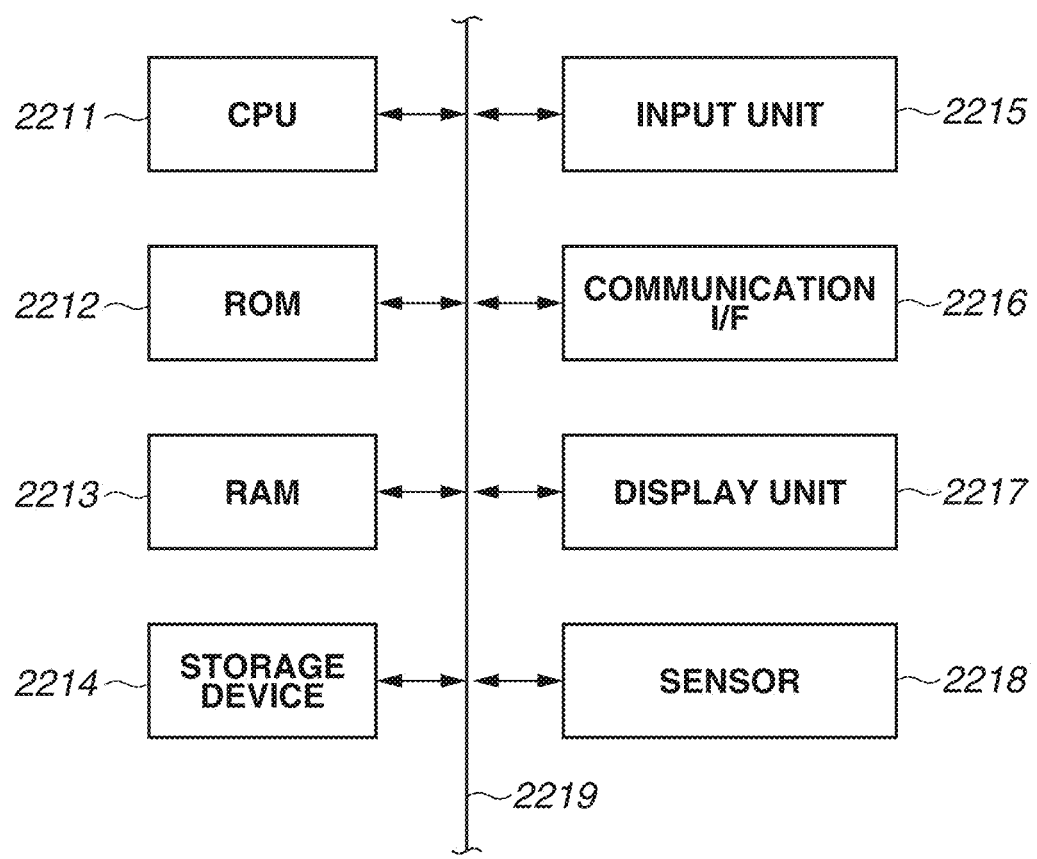
FIG. 21 is a block diagram illustrating an example of a hardware configuration of the information processing apparatus.

FIG. 21 is a block diagram illustrating an example of a hardware configuration of the information processing apparatus. Using a random-access memory (RAM) 213 as a work memory, a central processing unit (CPU) 211 reads and executes an operating system (OS) and other programs stored in a read-only memory (ROM) 212 or a storage device 214 and controls components connected to a system bus 219, thereby performing calculations and logical determinations in various processes. Processing executed by the CPU 211 includes information processing according to the present exemplary embodiment. The storage device 214 is a hard disk drive or an external storage device and stores a program and various types of data regarding the information processing according to the present exemplary embodiment. An input unit 215 is an imaging apparatus such as a camera, or an input device such as a button, a keyboard, and a touch panel for inputting a user instruction. The storage device 214 is connected to the system bus 219, for example, via a Serial AT Attachment (SATA) interface, and the input unit 215 is connected to the system bus 219, for example, via a Universal Serial Bus (USB) serial bus. The details of these connections are not described. A communication interface (I/F) 216 wirelessly communicates with an external device. A display unit 217 is a display. A sensor 218 is an image sensor or a distance sensor. The measurement result of the sensor 218 is stored as an image in the storage device 214. The CPU 211 executes a program and thereby can function as various units. Alternatively, a control circuit such as an application-specific integrated circuit (ASIC) that cooperates with the CPU 211 may function as these units. Yet alternatively, these units may be achieved by the cooperation of the CPU 211 and a control circuit that controls the operation of the information processing apparatus. The CPU 211 does not need to be a single CPU, and may be a plurality of CPUs. In this case, the plurality of CPUs can execute processing in a distributed manner. The plurality of CPUs may be arranged in a single computer, or may be arranged in a plurality of physically different computers. Alternatively, the units achieved by the CPU 211 executing the program may be achieved by a dedicated circuit.

FIG. 1 is a block diagram illustrating an example of a functional configuration of the information processing apparatus. With reference to FIG. 1, the functional configuration is described. An information processing apparatus 1 includes an image input unit 101, a feature extraction unit 102, a likelihood map generation unit 104, an integration unit 107, an output unit 108, and a storage unit 109. The image input unit 101 acquires an image from the storage device 214 or the imaging apparatus. The feature extraction unit 102 processes this input image, thereby generating an image feature 103 indicating the features of various objects included in the image. If the image feature 103 is input to the likelihood map generation unit 104, then based on trained models that each output a likelihood map indicating, with respect to each region, a likelihood indicating the possibility that a particular object is present, the likelihood map generation unit 104 generates a plurality of likelihood maps. In this case, sets of connection weight parameters between layers of each of the trained models are prepared in different combinations. Each of these parameter sets is learned using loss functions so that even if objects of the same type or of similar sizes are adjacent to each other, each of the objects can be detected on a different map. The integration unit 107 integrates the plurality of generated maps and outputs a map indicating the position where a particular object is present. Based on the integration result, the output unit 108 outputs the positions where objects as recognition targets are present in the input image. The storage unit 109 stores a teacher value that is an output target value when the parameters in the trained models are learned. The teacher value may have not only a configuration in which data prepared and stored in advance is acquired, but also a configuration in which a user or an external apparatus can input a teacher value indicating the position where a particular object is present in the image.

<Operation of Recognition Process>

Next, with reference to FIG. 2, a processing procedure is described. FIG. 2 is a flowchart illustrating processing executed by the information processing apparatus 1. However, the information processing apparatus 1 does not necessarily need to perform all the steps described in this flowchart.

The information processing apparatus according to the present exemplary embodiment detects the positions of a plurality of objects included in an input image. For example, from an image in which a plurality of objects (people) appears, the information processing apparatus detects the position where each person is present. To this end, the information processing apparatus extracts an image feature indicating the objects from the input image. Next, based on the extracted image feature, the information processing apparatus generates at least two maps that each output a likelihood indicating the possibility that an object (person) is present. The generated maps are updated to maps that each output a different detection result (likelihood) so that each map can detect objects present at different positions. The update method will be described below. The maps are updated based on a loss function for, regarding a position of interest where a likelihood greater than a predetermined value is output among the generated plurality of maps, outputting a loss value based on the value of a likelihood at a position near the region of interest in the same map or different maps. In this way, even in a case where a plurality of objects is located close to each other and seems to overlap each other on an image, the positions of the individual objects can be separately detected.

First, in step S1, the image input unit 101 inputs an input image in which objects as recognition targets appear. The input image may be not only a red, green, and blue (RGB) color image, but also a monochrome image or a grayscale image. Alternatively, the input image may be not only an image captured by a camera, but also an infrared photograph obtained by an infrared camera or a distance image obtained by an active distance sensor typified by a light detection and ranging (Lidar) sensor or a time-of-flight (ToF) sensor. The image and distance information may be simultaneously acquired. The use of the distance information in combination with the image enables, for example, specifying the number of people included in the image or generating a likelihood map based on the distance from the distance sensor. Next, in step S2, the feature extraction unit 102 extracts an image feature from the input image. As the image feature, various known methods are possible, such as a feature vector obtained by aggregating the colors or the textures of pixels. The image feature is not limited to a particular method, and any method can be adapted to the image feature so long as the method uses a map-like feature (feature amount and two-dimensional coordinate). The feature extraction unit 102 according to the present exemplary embodiment includes a multi-layer neural network 102a. Specifically, the feature extraction unit 102 extracts the image feature by performing the following procedure.

<Procedure for Extracting Image Feature>

A description is given of a method for extracting a map-like high-dimensional image feature using the multi-layer neural network 102a performed in step S2. FIG. 3 is a flowchart illustrating processing executed by the feature extraction unit 102. First, in step S201, the feature extraction unit 102 initializes a three-dimensional array F(x, y) for the neural network 102a to store an image feature (x and y are indices regarding a pixel of the feature). Next, in steps S202 to S207, in each layer of the neural network 102a, a calculation process is performed on the input image.

In step S203, the neural network 102a according to the present exemplary embodiment performs a calculation process in each layer as illustrated in FIG. 4. The "calculation process" as used herein refers to the process of, in each layer of the neural network 102a, extracting from the input image an image feature for detecting an object in a detection process at a subsequent stage. The neural network 102a includes convolution processes 402a, 402b, and 402c for performing a convolution filter process on an input image 401 multiple times. Further, the neural network 102a includes activation function processes (not illustrated) to be performed after the respective convolution processes 402a, 402b, and 402c. Further, the neural network 102a includes pooling processes 404a and 404b. A convolution filter process and an activation function process in an L-th layer are represented by the following mathematical formula.

$$f_L(x,y,\text{CHOUT}) = \theta(\Sigma \text{CHIN} \Sigma \Delta x, \Delta y = -K \sim +K wL(\Delta x, \Delta y, \text{CHIN}, \text{CHOUT}) \times f_{L-1}(x+\Delta x, y+\Delta x, \text{CHIN}) + B^L \text{CHOUT}),$$ <Mathematical Formula 1>

$\theta(x) := 0$ if $x < 0$
$\theta(x) := x$ otherwise

In mathematical formula 1, $f_L(x, y, z)$ is the result of a feature map output from the L-th layer and is composed of z maps (in FIG. 4, the unit "ch" represents the number of feature maps). $\theta(\cdot)$ is an activation function based on half-wave rectification. $w^L(\Delta x, \Delta y, \text{CHIN}, \text{CHOUT})$ (where $\Delta x, \Delta y \in \{-K, \ldots, 0, \ldots, K\}$) is a weight parameter of the convolution of the L-th layer. $B^L$ is a bias term of the L-th layer. CHIN represents the number of a feature map output from an (L−1)-th layer. CHOUT represents the number of a feature map output from the L-th layer. In the above formula, an input image I(x, y) composed of three RGB channels is treated as a feature map $f_0(x, y, z)$.

At this time, a value of 0 is input to pixels around the feature map $f_{L-1}$ before the convolution process so that the size in x and y directions of the feature map $f_{L-1}$ does not change before and after the convolution (padding process).

Each of the pooling processes 404a and 404b is the process of representing the feature map for each predetermined local region with a representative value, thereby reducing the size of the map. The pooling process has the effect of making the recognition performance of a convolutional neural network (CNN) robust, but on the other hand, has the property of decreasing the resulting resolution. In the example illustrated in FIG. 4, each of the pooling processes 404a and 404b is the process of integrating the feature map for each 2×2 pixels on the feature map, thereby reducing the feature map to a feature map having half the original resolution.

By the above calculation process, feature maps 403a, 403b, and 403c are generated at the respective stages of the layers of the CNN. The above technique is a general technique regarding a CNN, is widely known from J. Redmon, A. Farhadi, YOLO9000: Better, Faster, Stronger, CVPR, 2017 (described above), and A. Krizhevsky et al., ImageNet Classification with Deep Convolutional Neural Networks, NIPS 2012, and M. D. Zeiler, R. Fergus, Visualizing and Understanding Convolutional Networks, ECCV 2014 (described below), and therefore is not described in further details. See the prior literature as needed.

The CNN learns weight parameters in advance by a classification task using a large-scale database that is performed in A. Krizhevsky et al., ImageNet Classification with Deep Convolutional Neural Networks, NIPS 2012. As a result, as the low-layer feature map 403a close to the input image of the CNN, a map is generated that responds well to a simple pattern such as the slopes of lines in the image. Then, as the high-layer feature map 403c at a subsequent stage, a map is generated in which image patterns are aggregated in a wider range, and responds to a complicated pattern shape. The above properties of the CNN are widely known from M. D. Zeiler, R. Fergus, Visualizing and Understanding Convolutional Networks, ECCV 2014.

Next, in step S204, the neural network 102a determines whether a layer currently processed by the neural network 102a is a predetermined layer. If the currently processed layer is the predetermined layer (Yes in step S204), the processing proceeds to step S205. In step S205, the neural network 102a changes the resolution of the feature map 403 to a predetermined resolution. Then, in step S206, the neural network 102a connects and adds the feature map 403 to a feature array. The predetermined layer is a layer set in advance at the time of design so that the layer will be extracted, and some or all of layers may be connected. The connection process is not performed on a layer other than the predetermined layer. This process is repeated to ultimately obtain the image feature 103 in which a plurality of feature maps is connected together. The above process is represented by the following mathematical formula. That is, an image feature is extracted for each pixel, and a feature map is generated in which the feature and the pixel are associated.

$$F(x,y) = [f_1(x,y)^T, f_2(x,y)^T, \ldots, f_M(x,y)^T]^T$$ <Mathematical Formula 2>

In mathematical formula 2, $f_1, f_2, \ldots, f_M$ represent extracted predetermined feature maps. A feature F is obtained by connecting the feature maps in a Z-dimensional direction. x and y are the coordinates of the pixel of each feature map.

Generally, the CNN performs the pooling processes, and therefore, the resolutions of the feature maps differ depending on the layers. Thus, in step S205, a connection feature generation unit 204 changes the resolutions of the feature maps by performing up-sampling processes 405a and 405b (or down-sampling processes) before the above connection, to match the resolutions of the feature maps with a predetermined resolution. The changes in the resolutions are made by a general method such as copy of a value or linear interpolation. In FIG. 4, the feature maps 403b and 403c are up-sampled to 2 times and 4 times, respectively, to match the resolutions of the feature maps $f_1$, $f_2$, and $f_3$ with that of the input image I(x, y). As a result, the feature F(x, y) is obtained as the image feature 103.

In this form, the resolutions of the input image I(x, y) and the feature F(x, y) are the same. However, if the magnification of each up-sampling (down-sampling) process is changed, a feature having a finer (or coarser) resolution than that of the input image I(x, y) can also be extracted. In the description of the present exemplary embodiment, an individual pixel of the feature F(x, y) will be hereinafter referred to as a "region block" as a generalized name. This is the description of step S2 where the image feature is generated.

<Generation of Likelihood Maps>

In step S3, the likelihood map generation unit 104 sets different weight parameters in trained models that, if an image feature extracted from an input image is input to each trained model, each output a likelihood map including, in association with a position in the input image, a likelihood indicating the possibility that an object is present, thereby generating a plurality of likelihood maps. In this case, based on the image feature obtained at the previous stage, likelihood map generation units 1 to N (trained models in which N types of weight parameters are set) generate N likelihood maps regarding a face. The reason why a plurality of likelihood maps is generated is that even if a plurality of objects is close to or overlaps each other, all the plurality of objects can be detected as much as possible. Basically, the functions of the likelihood maps are of the same quality. The likelihood map generation units 1 to N have learned different weight parameters respectively so that among the likelihood maps output from the likelihood map generation units 1 to N, the same object is not redundantly detected in a plurality of maps, and objects adjacent to each other are not detected in the same map. This learning method will be described below at a portion of a learning process.

Specifically, each likelihood map generation unit performs a convolution calculation in a size of 1×1 for each region, thereby calculating a score value (hereinafter referred to as a "likelihood score") indicating whether a particular object (in this case, the feature of a face so that a person can be detected) is present (following formula). In this case, using weight parameters w and b determined in advance by learning, the likelihood map generation unit performs a convolution calculation process on the feature of each region. As a result, the likelihood map generation unit acquires a likelihood indicating the possibility that an object is present in the region.

$$v_k(x,y)=g(\Sigma_j w k_j \cdot f_{xyj}+b_k),$$ <Mathematical Formula 3>

In mathematical formula 3, $v_k$ is the likelihood score (k=1, 2, . . . , N) of a k-th likelihood map. $f_{xyj}$ is an element in a j-th dimension of the high-dimensional feature F(x, y). w and b are parameters of the convolution of a vertical and horizontal size of 1×1. The parameters w and b are adjusted in advance based on the image feature by the learning process so that each of the parameters w and b independently generates a map having a likelihood score regarding a face.

A function g(•) is a function for standardizing the score value and is defined by the following mathematical formula.

$$\text{Sigmoid}(x):=1/\{1+\exp(-x)\}$$ <Mathematical Formula 4>

In mathematical formula 4, the function g standardizes the likelihood score to the range from 0 to 1. As the function g, not only the above form, but also another appropriate non-linear function for standardization may be used. In this case, the higher (the closer to 1) the likelihood is, the higher the possibility that a face is present is.

<Process for Updating Likelihood Maps>

Steps S4 to S7 are the process of updating the likelihood maps. The likelihood maps are maps for use in the process of outputting the likelihood (a score indicating the possibility that a target object is present) of each region from the input image. In each region, an internal parameter for outputting the likelihood is set. In this mechanism, as a result of the above learning, internal parameters in the likelihood maps differ for each likelihood map, and different likelihoods are output for a common position in the same input image.

In the plurality of likelihood maps obtained at the previous stage, the same object can be redundantly detected between likelihood maps, or an object having a low likelihood score can be included in each map. Thus, in this processing step, the outputs of the likelihood maps are adjusted. A first adjustment value is determined so that a likelihood acquired for each of the plurality of likelihood maps and acquired at a position close to a position of interest (the position where the likelihood is greater than or equal to a threshold) in each likelihood map becomes smaller, and likelihoods estimated on the likelihood maps are updated. Further, a second adjustment value for making a position indicating a likelihood greater than a predetermined value different between two predetermined likelihood maps among the plurality of likelihood maps is determined, and likelihoods estimated on the likelihood maps are updated.

However, if the results of the likelihood maps are excellent, this step is not necessarily required. As will be described below, there can also be a case where a function similar to that in this step is integrally achieved by a deep neural network (DNN) at the previous stage. In this case, however, for convenience of description, this process is treated as a single independent processing module and described as a form in which the likelihood map generation unit 104 adjusts the outputs of the likelihood maps.

First, as illustrated in FIG. 1, an inter-map connection 105 is included between likelihood maps, and an intra-map connection 106 is included within each likelihood map. Through these connections, each region block on each map updates the state of the region block based on the states of maps or regions near the region block. FIG. 5 illustrates specific exemplary forms of these connections. As illustrated in FIG. 5, an inter-map suppression connection 25 is included between maps, and an intra-map suppression connection 24 is included between blocks within the same map. In an input image in FIG. 5, two people on the right side of the image overlap each other. The outputs of likelihood maps 2 and 3 in a likelihood map group 22 illustrate an example where these two people are detected in the same region (block). In this case, it is understood that as the appearance of the detection results, scores (likelihoods greater than the threshold) corresponding to two physical objects are detected at image coordinates (5, 3). On different likelihood maps, if likelihoods greater than the threshold are detected at the same image coordinates in the state where the models are trained so that high likelihoods are given to different people, this means that the same person is not double counted, and two objects present in the same region or regions adjacent to each other are detected. In a conventional method, a single likelihood map is output for an input image. Thus, in a region where objects adjacent to each other are present, only a detection result corresponding to a single person can be obtained. However, in the present exemplary embodiment, even in a case where objects adjacent to each other are present in the same region (block), different likelihood maps calculate respective likelihoods. Thus, even the objects adjacent to each other can be detected.

In step S5, the sums of input signals of these connections are determined based on the following formula. In step S6, the likelihood score $v_k$ of each likelihood map is updated. Weights including ω are learned together when the learning process described below is performed. Loss values are calculated in various portions, and learning is performed to minimize the sum of all the loss values. All the weights including ω are appropriately adjusted to minimize the sum of the loss values. $z^{INTRA}$ and $z^{INTER}$ are adjustment values for examining the outputs of responses within a likelihood map and between likelihood maps, respectively, and determining whether to enhance or reduce the responses taking the influences of the responses into account.

$$z^{INTRA}_k(x,y) = \Sigma_{\Delta x, \Delta y \in R} \omega^{INTRA}_{\Delta x \Delta y} \cdot v_k(x+\Delta x, y+\Delta y)$$

$$z^{INTER}_k(x,y) = \Sigma_{k' \neq k} \omega^{INTER}_{kk'} \cdot v_{k'}(x,y) \qquad \text{<Mathematical Formula 5>}$$

$$v_k^{NEW}(x,y) = g(\alpha_k v_k + z_k^{INTRA} + z_k^{INTER} + \beta_k). \quad \text{<Mathematical Formula 6>}$$

In mathematical formulas 5 and 6, $z_k^{INTRA}$ and $z_k^{INTER}$ are the sums of input signals within a map and between maps, respectively. $\omega^{INTRA}$ and $\omega^{INTER}$ are the strengths of connection weights within a map and between maps, respectively. $z_k^{INTRA}$ and $z_k^{INTER}$ are adjustment values for examining the outputs of responses within a likelihood map and between likelihood maps, respectively, and determining whether to enhance or reduce the responses taking the influences of the responses into account. The two values Z are added to a value $v_k^{NEW}(x, y)$ before the adjustment, and the gain of the value $v_k^{NEW}(x, y)$ is adjusted by g(so that the value $v_k^{NEW}(x, y)$ does not diverge. R is a set of near blocks and indicates the range where the blocks connect to each other in the same map. α and β are adjustment values for the outputs of likelihood maps. The parameters α, β, and ω are appropriately adjusted in advance by the learning process.

Figure 6A:
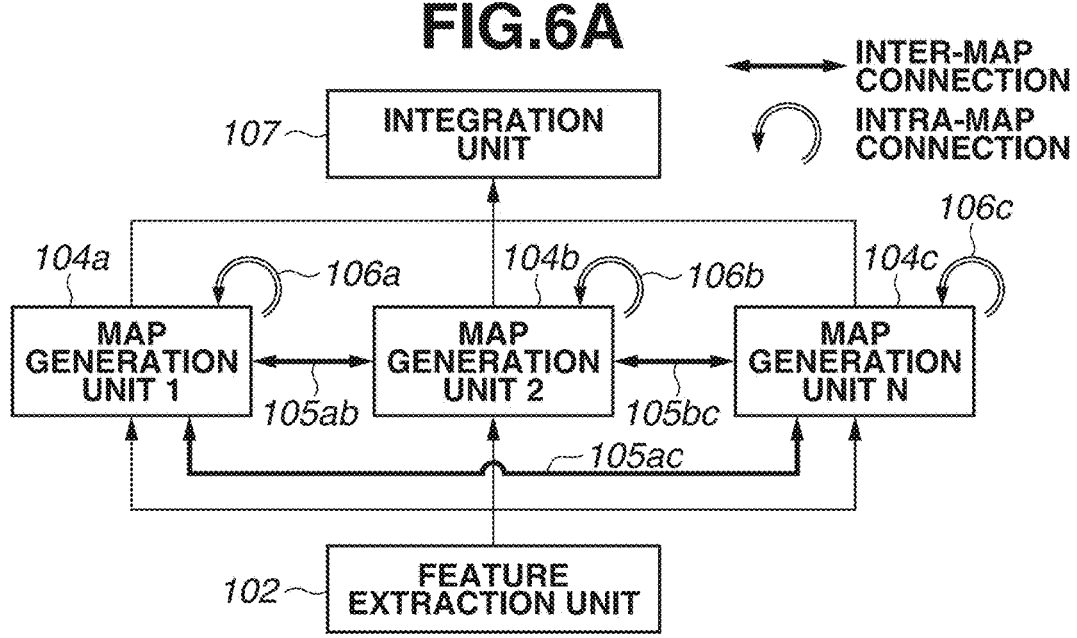
FIGS. 6A and 6B are block diagrams conceptually illustrating a likelihood map generation unit.
Figure 6B:
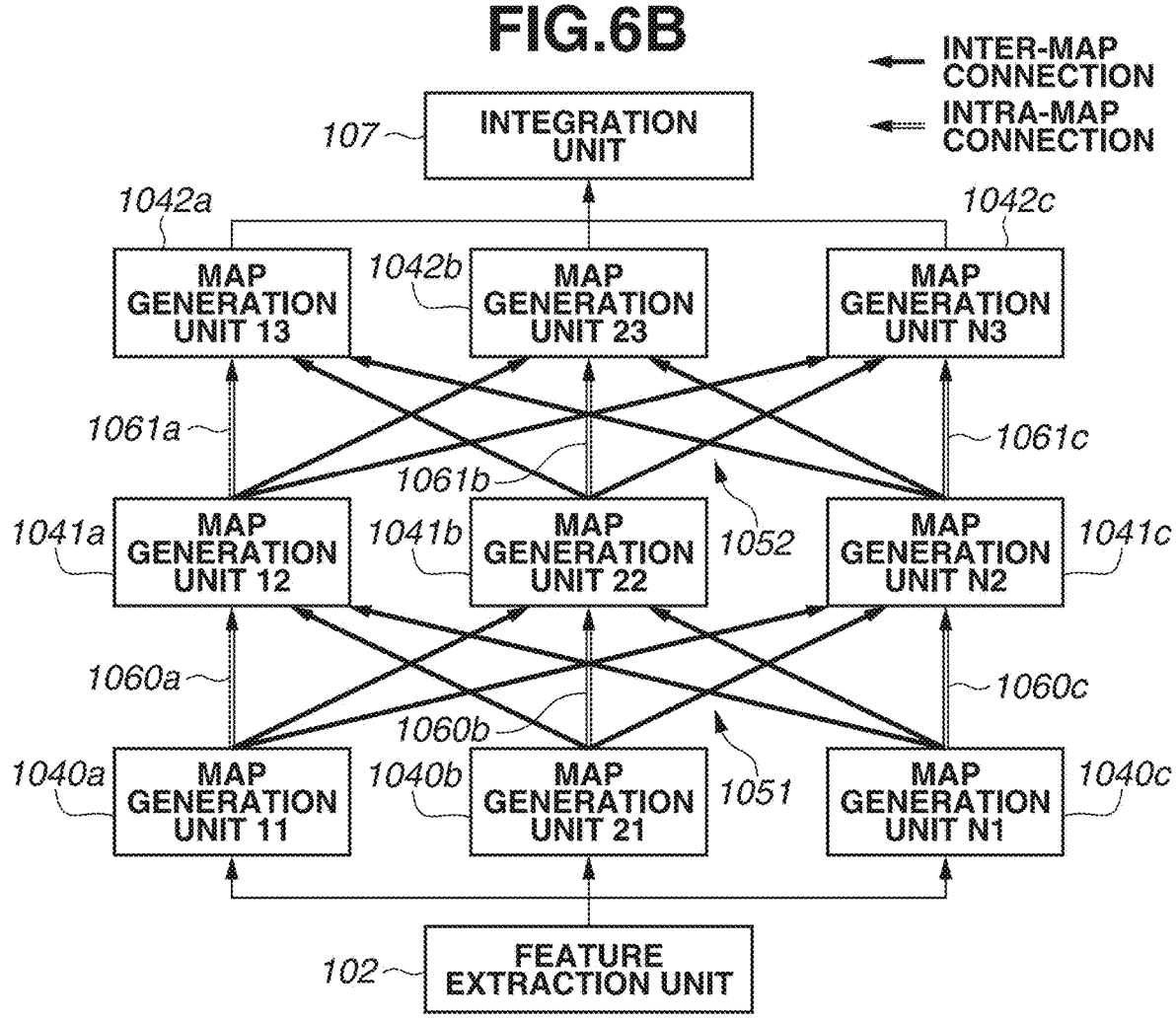

The above update process may be repeated multiple times, or may be performed only once. FIGS. 6A and 6B illustrate block diagrams of the update process as two example forms. FIG. 6A illustrates a recursive connection process. FIG. 6B is obtained by limiting the repetitions of recursive connections in FIG. 6A to three times and replacing all the connections with equivalent feedforward connections. The form as illustrated in FIG. 6B may sometimes be suitable particularly when learning is performed or when hardware is implemented.

The above processes of steps S4 to S7 illustrate an example of an integration process for referring to a plurality of likelihood maps and obtaining a single estimation result. Likelihoods indicated by the plurality of maps are cross-referenced before the integration, whereby, even in the state where the training of a learning model is not sufficiently advanced, the position of an object can be detected in a rule-based manner. <The likelihoods in a region of interest in likelihood maps> are <input to each other> based on mathematical formula 5, thereby adjusting the outputs of the likelihood maps. This process is performed for preventing the state where a single object is detected in two or more portions, or the state where two or more objects fuse together.

As another example form, a form as illustrated in FIG. 7 is also an example of the application of the disclosure as long as a function equivalent to the above is achieved. In this case, as a process corresponding to connection weights within a map and between maps, a convolution process 26 of a neural network is used, and recursive connections are not used. In the convolution process 26, likelihood maps in three channels are input, and likelihood maps in three channels are output. This can achieve an output adjustment process equivalent to the output adjustment based on the connections within a map and between maps in FIG. 5. In FIG. 7, as an example, a filled circle indicates the weight of a negative coefficient of convolution, and a white circle indicates the weight of a positive coefficient of convolution.

<Integration Process>

In step S8, the integration unit 107 integrates the detection results dispersed on the respective likelihood maps (likelihoods at respective positions), thereby generating integration results. Further, using the integration results, the integration unit 107 outputs the position of a likelihood greater than or equal to a threshold as the position of an object. In this step, first, the integration unit 107 examines the likelihood score of each region block on each likelihood map k. If the score is greater than a predetermined threshold $\theta_k$, the integration unit 107 determines that a face is detected. Then, the integration unit 107 sets a variable $d_k$ to a value of 1 (the following formula). By this process, the position where the likelihood is greater than a predetermined value is set as a candidate region where an object is present.

$$d_k(x,y) = 1 \text{ if } v_k(x,y) \geq \theta_k$$

$$d_k(x,y) = 0 \text{ otherwise} \qquad \text{<Mathematical Formula 7>}$$

A three-dimensional matrix (three dimensions x, y, and k) including d (described above) as an element is defined as a likelihood map D in this case. Further, at this time, a non-maximum suppression process is also performed together. More specifically, in a k-th detection result $d_k$, if a plurality of objects is detected close to each other within a predetermined distance, it is determined that a multiple detection occurs. Then, only an object having the highest likelihood score is left as a true detection, and an object having the lower likelihood score is deleted as a false detection. The non-maximum suppression process is a general method known from J. Redmon, A. Farhadi, YOLO9000: Better, Faster, Stronger, CVPR, 2017, and therefore is not described in detail here.

While the non-maximum suppression process is performed in each likelihood map, the non-maximum suppression process is not performed between the likelihood maps 1 to N. If a plurality of responses occurs at the same position on a plurality of likelihood maps, it is determined that a plurality of objects is present at positions close to each other, and all the detection results are left.

Further, at this time, a more detailed position of an object may be estimated. As a specific example, the estimation is performed by a sub-pixel estimation method based on the likelihood score values of the likelihood maps. The sub-pixel estimation is independently performed on each likelihood map. The details of the sub-pixel estimation are widely known from Psarakis & Evangelidis, An Enhanced Correlation-Based Method for Stereo Correspondence with Sub-Pixel Accuracy, 2005. See this literature.

As another detailed estimation method, a map may be separately prepared that performs regression estimation on a position and a size. Then, based on the value of the map, the position and the size of an object may be finely adjusted. In this case, the estimation map for estimating a position and a size is to be prepared for each likelihood map k. In the present exemplary embodiment, the presence or absence of these pieces of ingenuity is not related to the essence of the disclosure, and therefore, the pieces of ingenuity are not described in detail. The pieces of ingenuity are known from J. Redmon, A. Farhadi, YOLO9000: Better, Faster, Stronger, CVPR, 2017. See this literature as needed.

The results of integrating the likelihood maps as described above are put together and output as a list of detection results, for example, as in integration results 23 in FIG. 5. FIG. 5 illustrates an example of a list of the positions and the likelihood scores of detected objects.

Finally, in step S9, based on the above integration results, the output unit 108 outputs a frame of a face to a display device. Thus, the recognition operation of the information processing apparatus 1 ends.

As another derived form of the integration process, a form is also possible in which the likelihood maps are not examined one by one, and the weighted sum of all the maps is obtained once, thereby generating a single map. Then, the likelihood score of the map is examined. There are also various options for the presence or absence of the non-maximum suppression and a method for the non-maximum suppression. Also as the threshold $\theta_k$ for the likelihood score value, not only a one-step threshold but also a two-step threshold can be used. As described above, a plurality of forms is possible for the integration of the likelihood maps. Thus, the integration of the likelihood maps is not limited to a particular form.

<Operation of Learning Process>

Figure 8:
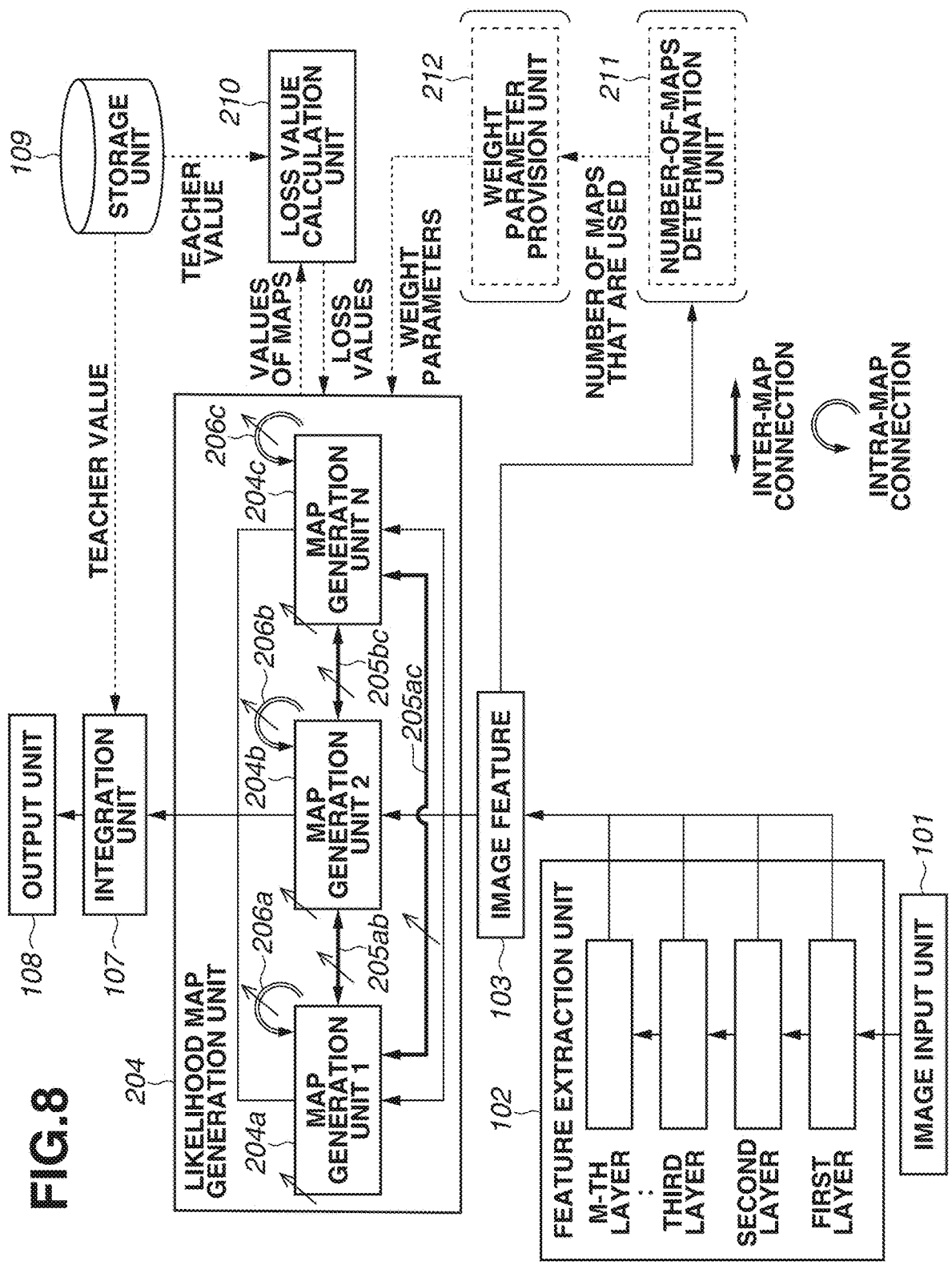
FIG. 8 is a block diagram illustrating an example of a functional configuration of the information processing apparatus.

Next, a learning operation of this recognition apparatus is described. FIG. 8 illustrates an example of a functional configuration of the information processing apparatus 1 when the learning operation is performed. In this case, a loss value calculation unit 210 required for learning is added.

FIG. 9A is a flowchart illustrating the learning process. First, in step S21 in FIG. 9A, the image input unit 101 selects a set of training images (batch data) and inputs the images. Simultaneously, in step S22, the storage unit 109 inputs a teacher value corresponding to each training image to the integration unit 107 and the loss value calculation unit 210. The teacher value indicates the center position of an object present in each image. The teacher value differs depending on the object to be detected or the task. For example, to detect a person, ground truth (GT) is given to the center position of the face of a person. To detect an object, GT is given to the position of the center of gravity. Specifically, in FIG. 10A, a teacher value 1002 corresponds to an input image 1001 and labels a region where the center position of the face of a person is present. Teacher data may be data in which the input image is associated with only the coordinates of a correct answer position. Alternatively, the teacher data may be data in a map format in which the center position of the face of a person is set to 1, and other positions are set to 0.

Next, in step S23, the feature extraction unit 102 extracts the feature of the input image. Then, likelihood map generation units 204a to 204c generate likelihood maps. Then, the integration unit 107 generates the result of integrating these likelihood maps. The likelihood maps may be integrated together using weights determined in advance, or an integration method may be learned.

Next, loss values regarding a recognition result required for the learning are calculated. In the learning according to the present exemplary embodiment, both a loss value regarding the final integration result and a loss value regarding the likelihood maps as intermediate products are used in learning calculation.

<Loss Function for Integrated Likelihood Map>

First, a method of a loss function for the integrated likelihood map is as follows.

In step S24, the integration unit 107 compares a loss function for the integrated likelihood map and a teacher value given in advance and outputs a loss value using a loss function (second loss function) regarding the detection position of an object. The second loss function adjusts a likelihood obtained by integrating a plurality of likelihood maps to be greater than a predetermined value at the position of an object (i.e., the teacher value) in the input image. Regarding the result of integrating the plurality of likelihood maps, if a likelihood associated with an acquired position is smaller than a threshold, this loss function decreases the likelihood. The loss value can be used in various forms. In this case, as an example, the loss value is calculated with respect to each region block (x, y) using a square error as in the following formula, and the sum of the loss values is obtained. First, using the correct position of the object indicated by the teacher data, a loss value for the position of the object estimated by inputting an input image to the learning model is obtained.

$$\text{Loss}^-(D, T^{NUM}) = \Sigma_{xy}(\Sigma_k d_k(x,y) - T^{NUM}(x,y))^2$$
<Mathematical Formula 8>

D is the integrated likelihood map, and $T^{NUM}(x, y)$ is the teacher value and gives the total number of objects of which the centers of the faces are located in a region block (x, y). Supervised learning is performed using the loss value in the above formula, whereby weight parameters for the network are adjusted so that the response results of the likelihood maps respond in agreement with the true number of objects as much as possible (a method for updating weight parameters in the learning will be described below). That is, if a high likelihood is not detected at the correct answer position, or if a high likelihood is detected at an incorrect position, the loss function in mathematical formula 8 outputs comparable loss values to all the likelihood maps.

As another form of the loss function, cross entropy can also be used as in the following formula. According to mathematical formula 9, when the likelihoods of the maps associated with the correct answer position indicated by GT are compared with each other, the position of an object may be able to be detected using any of the likelihood maps. In this case, regarding another likelihood map associated with the correct answer position and having a low likelihood, weight parameters between the layers of the likelihood map generation units 204a to 204c (learning models) are learned so that a likelihood indicating the possibility that an object is present at the correct answer position is small. If a certain region includes a plurality of objects, a likelihood map that outputs a great likelihood is prepared according to the number of the objects. Thus, as many GT maps indicating a great likelihood (e.g., 1.0) as the number of the objects are generated from GT. If the number of likelihood maps indicating a great likelihood is smaller than the number of the GT maps, an image feature near the certain region is learned so that more objects are detected. Using the loss function in mathematical formula 9, it is possible to perform more detailed learning than mathematical formula 8.

$$\text{Loss}(V,T) = \Sigma_{xy}\{\Sigma_k - t_k(x,y)\log(v'_k(x,y)) - (1 - t_k(x,y))\log(1 - v'_k(x,y))\}$$
<Mathematical Formula 9>

T is the teacher value and is a three-dimensional matrix having 0 or 1 as the value of an element t. The elements of T indicate whether (the center of) an object is present in each region or each map.

At this time, to appropriately calculate the loss value regarding the likelihood maps even in a case where a plurality of objects is present in the same block (x, y), the following ingenuity is provided. First, if n objects are present in a certain block (x, y), as the value of the teacher value T(x, y), a vector t of N elements composed of n values of 1 at the beginning and N-n values of 0 for the rest is given. Next, the likelihood score values $v_k(x, y)$ of the likelihood maps are sorted in descending order and set to be $v'_k(x, y)$ (hereinafter, t and v' will be referred to as a <sorted teacher value> and a <sorted score value>, respectively). After this process, the loss value is calculated using mathematical formula 9.

Here, one specific example is described. Suppose that there are N=4 likelihood maps, and two objects are present in a block (x, y) as a true value. Further, as a recognition result, the likelihood score values of the likelihood maps in the block (x, y) are obtained by the following mathematical formula.

$$V(x, y) = \begin{bmatrix} v_1(x, y), v_2(x, y), \\ v_3(x, y), v_4(x, y) \end{bmatrix}^T \quad \text{<Mathematical Formula 10>}$$
$$= [0.1, 0.7, 0.5, 0.9]^T$$

At this time, the sorted score value and the sorted teacher value obtained by sorting the likelihood score values are obtained by the following mathematical formula.

$$V'(x,y)=[0.9, 0.7, 0.5, 0.1]^T,$$

$$T(x,y)=[1,1,0,0]^T \quad \text{<Mathematical Formula 11>}$$

The loss value regarding this block is calculated by the following mathematical formula (some indices are omitted).

$$\text{Loss}=\Sigma_k -t_k \log(v'_k)-(1-t_k)\log(1-v'_k)=0.105+0.358+ \\ 0.693+0.105=1.261 \quad \text{<Mathematical Formula 12>}$$

If the likelihood maps detect all the recognition targets without excess or deficiency as a whole, the above loss value is zero. It should be noted that at this time, it does not matter which likelihood map detects which object. This loss value means that a particular correspondence relationship (e.g., a relationship where a likelihood map 1 responds to an object on the front side, and a likelihood map 2 responds to an object on the back side) is not particularly provided, and parameter sets in the likelihood map generation units 204a to 204c are trained so that the detection accuracies increase as a whole. This is the loss value regarding the <integration result> of the likelihood maps.

As described above, the loss value in the DNN can employ loss functions in various forms. An application target of the aspect of the embodiments is not limited to a loss value in a particular form. However, for convenience of learning calculations, a form in which a loss function can be subjected to a differentiation calculation in an analytical manner is applied.

<Calculation of Loss Value Regarding Likelihood Maps>

Next, a description is given of a method for, with respect to each likelihood map, calculating a loss value based on a score (likelihood) associated with each region in the likelihood map. First, in step S25, based on a score associated with each region in each likelihood map, a loss value is calculated. In step S26, based on a score associated with a corresponding region of interest between the plurality of likelihood maps, a loss value is calculated. FIGS. 10A and 10B are schematic diagrams thereof. If the loss values of these two types are appropriately designed, parameter sets in the likelihood map generation units 204a to 204c having the following two properties can be obtained by a plurality of types of pattern learning.

(1) A plurality of likelihood maps responds to a plurality of objects close to each other in a shared manner (2) Two or more likelihood maps do not respond to a single object First, a loss function (first loss function) regarding a single likelihood map is defined by the following formula. Regarding a first region of interest in the same likelihood map among the plurality of likelihood maps, based on the difference between a likelihood associated with a region near the first region of interest and a likelihood associated with the first region of interest, a loss function for decreasing the likelihood of the near region is used. The first loss function outputs a loss value so that the smaller the difference between the likelihood of the region of interest and the likelihood of the near region is, the greater the loss value is, thereby adjusting the direction in which the likelihood of the near region is made small. Further, the first loss function outputs the loss value so that the greater the difference between the likelihood of the region of interest and the likelihood of the near region is, the smaller the loss value is. Or if the difference between the likelihood of the region of interest and the likelihood of the near region is great, the first loss function does not give the loss value. Using such a loss function, the contrast between likelihoods obtained in regions adjacent to each other in the same map becomes sharper, and a likelihood map for detecting a single object in a single region can be obtained. In other words, it is possible to prevent a plurality of objects from being detected in a particular region in a single map.

$$\text{Loss}^{INTRA}=-\Sigma_{x,y}\Sigma_k\Sigma_{\Delta x, \Delta y, v \in R} \xi(\Delta x, \Delta y) v_k(x+\Delta x, y+\Delta y)$$
<Mathematical Formula 13>

A function $\xi$ is obtained by the following mathematical formula.

$$\xi(x,y):=\omega_1 \exp(-(x^2+y^2)/\rho_1)-\psi_2 \exp(-(x^2+y^2)/\rho_2)$$
<Mathematical Formula 14>

$\xi(x, y)$ is a Mexican hat function 1003 having a positive peak and negative depressions near the peak as illustrated in FIG. 10A where $\psi_1$, $\psi_2$, $\rho_1$, and $\rho_2$ are parameters for constants for determining the function shape. This loss value is the value of the sum of the results of convolving the likelihood maps using $\xi$ as a convolution kernel. R is the range of the region where the convolution is performed.

If a plurality of responses simultaneously occurs close to each other on a single likelihood map, a loss value $\text{Loss}^{INTRA}$ takes a great value. For example, suppose that as illustrated in FIG. 10A, an input image 1001 is input in which two objects (people) appear close to each other. In a likelihood map group 1004 generated by likelihood map generation units, a likelihood map 1 responds to both objects (the strengths of responses are indicated by the shades of grayscale). On the other hand, in a likelihood map group 1005, the likelihood map 1 and a likelihood map 2 dispersedly respond to the objects. In this case, due to the properties of the Mexican hat function, a great loss value is calculated in the likelihood map group 1004, and a small loss value is calculated in the likelihood map group 1005.

The above-described form is a form of a loss function for preventing "a plurality of objects close to each other from being simultaneously detected on a single likelihood map". Another form is also possible as a form to which the aspect of the embodiments is applicable. For example, a loss value can also be defined by the following formula.

$$\text{Loss}^{INTRA}=\Sigma_k \theta(\Sigma_{x,y} V_k(x,y)-\theta_{th}) \quad \text{<Mathematical Formula 15>}$$

In mathematical formula 15, $\theta(\cdot)$ is a function of half-wave rectification. If the sum of the likelihood scores of the likelihood maps exceeds a predetermined threshold $\theta_{th}$, this loss value imposes a penalty. More specifically, regarding a first region of interest in the same likelihood map among the plurality of likelihood maps, if a likelihood associated with the first region of interest is greater than a threshold, a loss function for decreasing a likelihood associated with a region near the first region of interest is used. Further, if the likelihood associated with the first region of interest is smaller than the threshold, the loss function outputs a loss value for decreasing the likelihood associated with the region near the first region of interest so that the loss value is smaller. Thus, if learning is performed using this loss value, an operation in which only any one of the likelihood maps prominently responds to an object is prevented. This is the description of a loss value defined for a single likelihood map.

Next, an example of a loss function (third loss function) for making positions indicating likelihoods greater than a predetermined value different between two predetermined likelihood maps among the plurality of likelihood maps is described. The third loss function compares the likelihoods of two predetermined likelihood maps among the plurality of likelihood maps. If a great likelihood is associated with the position of an object (second position of interest) in the input image, this loss function calculates a loss value for decreasing likelihoods that conflict with each other (at a corresponding position) between the two likelihood maps. The second position of interest is a corresponding position (or region) on each likelihood map including the position where an object indicated by the acquired teacher value is present. The third loss function is for dividing the roles of detection targets so that the same object is not detected on different likelihood maps, and different objects can be detected on different likelihood maps. The "two predetermined likelihood maps" refer to all the combinations of the generated plurality of likelihood maps. The third loss function is defined by the following mathematical formula.

$$\text{Loss}^{INTER} = -\Sigma_{xy}\Sigma_k \Phi_k(T(x,y)) \log\{\Phi_k(V'(x,y))\}$$
<Mathematical Formula 16> where $\Phi$ is a softmax function obtained by the following mathematical formula.

$$\Phi_i(X) := \exp(x_i)/\Sigma_{j=1 \text{ to } N} \exp(x_j), \ X = [x_1, \ldots, x_N]^T$$
<Mathematical Formula 17> where $T(x, y)$ and $V'(x, y)$ are vectors composed of N elements and are the same as the <sorted teacher value> and the <sorted score value>, respectively.

In the second or third loss function, the loss value differs depending on the number of objects and the number of likelihood maps. For example, if only a single object is present in a region of interest, then based on likelihoods associated with regions of interest at a position common to two likelihood maps, the second loss function outputs a great loss value for at least one of the regions of interest in the two likelihood maps. If two or more objects are present in a region of interest, a loss value is determined as follows. For as many likelihood maps as the number m of objects, when likelihoods estimated in regions of interest in the likelihood maps are low, the loss value is determined to make the likelihoods great. If the number of likelihood maps is greater than the number m of objects, a loss value is determined as follows. For regions of interest in an (m+1)th likelihood map and subsequent maps when regions of interest in the likelihood maps are sorted in descending order of likelihood, the loss value is determined to make the likelihoods small. Further, if a great likelihood is estimated in a region on a likelihood map corresponding to the position where an object is not present in the input image, a great loss value is determined to make the likelihood small. In other words, if there is a single position of an object included in the input image based on the acquired position of an object, the second or third loss function makes greater a likelihood associated with a second region of interest in any one of the plurality of likelihood maps. If there is a plurality of positions of objects included in the input image based on information regarding the acquired positions of objects, a loss value is determined to adjust likelihoods estimated in second regions of interest in likelihood maps to be greater than a predetermined threshold depending on the number of objects. It can be determined that the smaller the loss value is, the more advanced the learning is. Thus, in the subsequent learning process, parameters are adjusted to make the calculated loss value small (or cause the calculated loss value to converge).

FIG. 10B illustrates an example of the result of the above loss function. In this case, an input image 1006 is input in which a single object appears. If both maps 1 and 2 simultaneously respond to the object as in a response result 1008, the loss value $\text{Loss}^{INTER}$ takes a great value. In contrast, if only either one of the likelihood maps 1 and 2 correctly responds to the object as in a response result 1009, the loss value $\text{Loss}^{INTER}$ takes a small value.

In the above-described loss function, the softmax function and the sorted likelihood score are used. However, this merely illustrates an example achievement. Various forms can be employed as long as a loss function is designed to promote the state where "only a region on a single map responds to a single object as much as possible". This is the definitions of loss values regarding likelihood maps.

<Updates of Learning Parameters>

Next, using the loss values acquired by the various loss functions obtained in this way, the weight parameters in the trained models are updated. First, parameters to be learning and update targets in this form are weight parameters $w_k$ and $b_k$ in each of the likelihood map generation units 204a, 204a, and 204c in FIG. 8. Further, parameters to be learning and update targets in this form are weight parameters $\omega^{INTRA\Delta x \Delta y}$ and $\omega^{INTERkk'}$ and connection adjustment parameters $\alpha_k$ and $\beta_k$ for an intra-map connection and an inter-map connection in the likelihood map generation units 204a, 204a, and 204c (k is an index indicating a k-th likelihood map generation unit). In FIG. 8, a parameter to be a learning target is indicated by an upper right direction arrow.

Each of the above-described parameters is initialized with a random number and starts to be learned. Particularly, the likelihood maps are maps of the same quality and are designed to lead responses to targets to disperse on the maps by giving conflicting loss values to the maps to be learned. If the initial values of the weight parameters $w_k$ and $b_k$ in the maps are the same, the same responses occur and conflict with each other, and the learning does not appropriately advance. Thus, the likelihood maps are to be initialized with different values.

The value of the sum of the loss values calculated by the above method may be defined as E, E may be calculated with respect to each batch set of the input image, and the parameters may be finely updated in the direction of a gradient that reduces E. More specifically, in step S27, the values of the parameters are updated by the following formula. For example, the parameter set is updated until E converges to a value smaller than a predetermined value.

$$E = \text{Loss} + \lambda_1 \text{Loss}^{INTRA} + \lambda_2 \text{Loss}^{INTER}, \ w^{t+1} = \eta_1 \partial E/\partial w^t + w^t,$$

$$b^{t+1} = \eta_1 \partial E/\partial b^t + b^t,$$

$$\omega^{t+1} = \eta_2 \partial E/\partial \omega^t + \omega^t,$$

$$\alpha^{t+1}=\eta_2 \partial E/\partial \alpha^t + \alpha^t,$$

$$\beta^{t+1}=\eta_2 \partial E/\partial \beta^t + \beta^t.$$ <Mathematical Formula 18>

In the formula 18, Loss is the loss value calculated for the integration result of the likelihood maps. $\lambda_1$ and $\lambda_2$ are constants for adjusting the balance between the various loss values. $\eta_1$ and $\eta_2$ are appropriately set fine coefficients (learning coefficients) less than or equal to 1. The value of each partial derivative $\partial E/\partial x$ is obtained using an error backpropagation method, which is a general method for a neural network. The error backpropagation method is widely known from Y. Le Cun et al. Handwritten digit recognition with a back-propagation network. 1990, and therefore the description thereof is omitted here. In the above-described formula, for simplicity, some indices are omitted.

Although the connection weights ω in the likelihood map generation unit 104 include recursive connections, a general method in the learning of a recursive network is used in combination to learn ω (e.g., the connection weights ω are expanded into processing blocks having a finite number of repetitions and then updated by the error backpropagation method as illustrated in FIG. 6B).

The weights of the neural network 102a of the feature extraction unit 102, which are not learning targets at this time, may also be similarly learned by the error backpropagation method. This method is a form in which weight parameters are learned consistently from input to output, and is termed "end-to-end learning").

Further, a form is also possible in which the detection threshold parameter $O_k$ of the integration unit 107 is added to learning target parameters.

<Derived Forms>

The function modules of the processing blocks and the learning forms of the function modules have been sequentially described. Some examples of other possible derived forms are added here.

For example, in the calculations of the loss values, the method for calculating the loss value regarding the integration result and the method for calculating the loss value regarding each likelihood map have been described. As another form, a form is also possible in which either one of the methods is used, or the methods are partially used, or these methods are switched according to the progress of the learning.

For example, in the above descriptions, an object is detected by learning the center position of the object as a reference position. However, this reference position can also be changed. Although the number of likelihood maps increases, a form may be employed in which, for example, an object is detected by learning a map on which the upper, lower, left, and right ends of the object are estimated as reference positions.

In the present exemplary embodiment, targets are recognized using N likelihood map generation units and N likelihood maps as the results of the N likelihood map generation units. Alternatively, a method of dynamically changing the number N when targets are recognized is also possible. For example, when many targets overlap each other in an image, it is considered that the greater the number of likelihood maps is, the higher the detection accuracy is. If, however, the number of maps is too great for the number of objects, noise-like responses may even increase, or an unnecessary amount of calculation may increase. Thus, a form can also be possible in which the number of likelihood maps is appropriately increased or decreased.

To describe this, FIG. 8 additionally illustrates a number-of-maps determination unit 211 and a weight parameter provision unit 212. Taking an image scene into account based on the image feature 103, the number-of-maps determination unit 211 determines the number n of maps so that the most excellent result can be obtained (e.g., great n is given to an image crowded with target objects). Next, the weight parameter provision unit 212 having received the result of the determination provides n weight parameters to 1 to n likelihood map generation units.

As the method of the number-of-maps determination unit 211 determining the number of maps, for example, the following form is possible. First, N information processing apparatuses having N different settings composed of 1, 2, ..., N likelihood map generation units are prepared and individually trained in advance. Next, the accuracies of the detection results when an input image x is given are examined regarding the N settings, and the good/bad values of the accuracies are stored. As a reference for measuring the detection accuracies, for example, the loss value regarding the integration result of the integration unit 107 may be used.

Using the image feature 103 of the image x as an explanatory variable and the accuracies of the detection results as target variables, the number-of-maps determination unit 211 performs regression learning for estimating the detection accuracies of the N information processing apparatuses using a general method such as a neural network or support vector regression. When targets are recognized, the number-of-maps determination unit 211, using the estimation results of this regressor, examines the expected values of the detection accuracies of the N settings and employs the number n of maps having the highest expected value. At this time, using a combined index taking also into account the paucity of maps that are used (=the total amount of calculation) in the estimated detection accuracies, and based on the accuracies and the amount of calculation, the number-of-maps determination unit 211 may determine the number of maps that are used. In this way, it is possible to dynamically change the configuration of likelihood maps.

Yet another derived form is as follows. In the above descriptions, in the present exemplary embodiment, for convenience of description, the processing modules can be clearly distinguished from each other. Another possible form is a form in which the components of a neural network have functions equivalent to the function modules according to the present exemplary embodiment and are connected together without boundaries.

For example, a form is possible in which the functions of the feature extraction unit 102, a plurality of likelihood map generation units 104, the inter-likelihood-map connection 105, the intra-map connection 106, and the integration unit 107 are achieved dispersedly on the layers of a DNN. To achieve such functions, it is determined to some extent which functional role is achieved in which layer, and then, a DNN that has the number of layers, the number of input and output channels, and the connection relationships between the layers that can sufficiently achieve the functions is prepared. Next, loss functions for an intermediate layer and a final layer are appropriately designed according to the functional roles to be achieved. Then, learning data and a teacher value are given to the DNN, to learn the learning data and the teacher value. If the training is not successful, the output of the intermediate layer is examined. Then, a case where feature representation and recognition power are insufficient to achieve the functions and a case where the number of repetitions (the number of layers) required to adjust the outputs is insufficient are identified, and the number of layers or the number of channels of a neuron in a required portion is appropriately increased. The above-described method is possible as an example form.

Yet another derived form is as follows. One of the essences of the aspect of the embodiments is that a plurality of likelihood maps responds to a plurality of objects of the same type. "The same type" as used herein may be a subset of an object category. For example, objects may be classified into categories different from each other by appearance size, aspect ratio, or orientation. Further, a form may be employed in which a superset is created by putting any plurality of categories together and is regarded as a single type. This corresponds to the classification of, for example, dogs and cats into a single category.

As an example, suppose that there are objects in a plurality of categories A, B, and C of different types, and the information processing apparatus includes a plurality of likelihood maps X and Y. If learning is performed so that both the likelihood maps X and Y detect all the objects in the categories A, B, and C, this is a form of the aspect of the embodiments. Further, if learning is performed so that the likelihood map X responds to the categories A and B, and the likelihood map Y responds to the categories B and C, this is also a form of the aspect of the embodiments as far as a plurality of likelihood maps responds to the category B. A form is also possible in which the likelihood maps are partially characterized in that both the likelihood maps X and Y respond to all objects in the categories A, B, and C, but the likelihood map X responds to the category A, and the likelihood map Y responds to the category B.

The derived forms obtained by applying the aspect of the embodiments have been described above. The foundation of the aspect of the embodiments is summarized as function modules designed so that when <a plurality of objects of the same type is present>, the plurality of objects is <detected dispersedly on a plurality of likelihood maps of the same quality>, or weight parameters in the function modules. The function modules and the weight parameters (or loss functions for appropriately learning the parameters) useful for the above purpose are included in the exemplary embodiment of the disclosure, and a form for achieving the aspect of the embodiments is not limited to a particular form. This is the description of the first exemplary embodiment.

Similar to the first exemplary embodiment, a second exemplary embodiment is intended to detect an object. FIG. 11 is a block diagram illustrating an example of a basic configuration of an information processing apparatus. The second exemplary embodiment is different from the first exemplary embodiment in that a plurality of feature aggregate units 303a to 303c is newly added to map generation units 304a to 304c. In the present exemplary embodiment, variations are added to a feature to be given to the likelihood map generation units 304. This changes the outputs of responses of likelihood maps and improves the degree of separation of objects located close to each other. The reason will be described below.

In the present exemplary embodiment, a connection between likelihood map generation units 304 and a connection within each likelihood map generation unit 304 are eliminated, and the updates of the likelihood maps that are performed in the processing flow in the first exemplary embodiment are not performed. However, as a derived form, a form is also possible in which, similar to the first exemplary embodiment, the likelihood maps are updated including the above connections in the configuration. As the hardware configuration of the information processing apparatus, similar to the first exemplary embodiment, the configuration as illustrated in FIG. 21 is used.

Figure 12A:
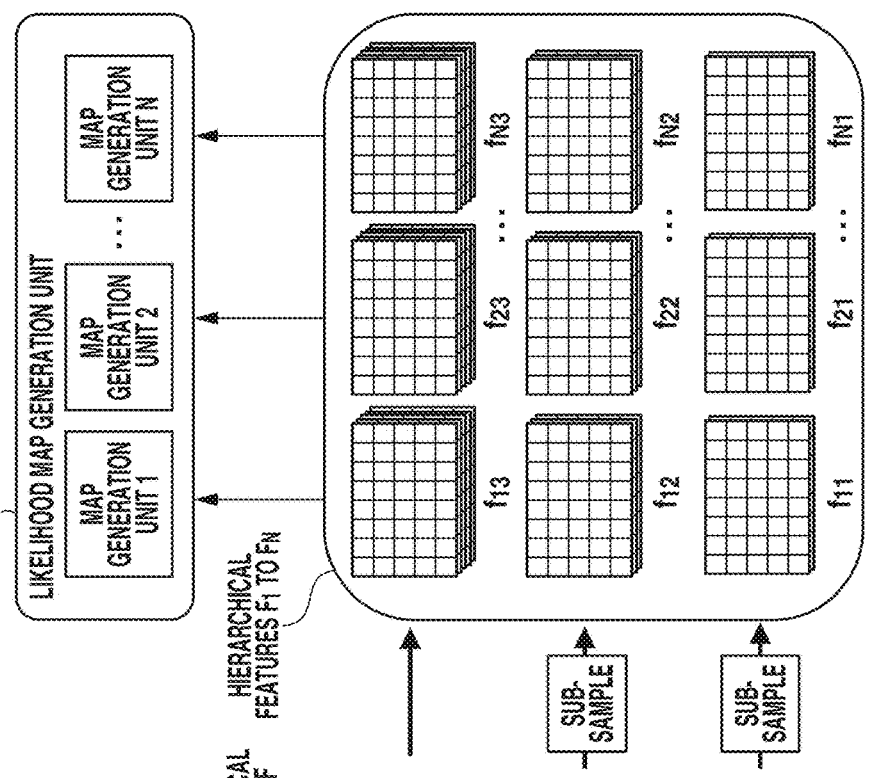
FIGS. 12A and 12B are diagrams schematically illustrating aggregate of features.
Figure 12B:
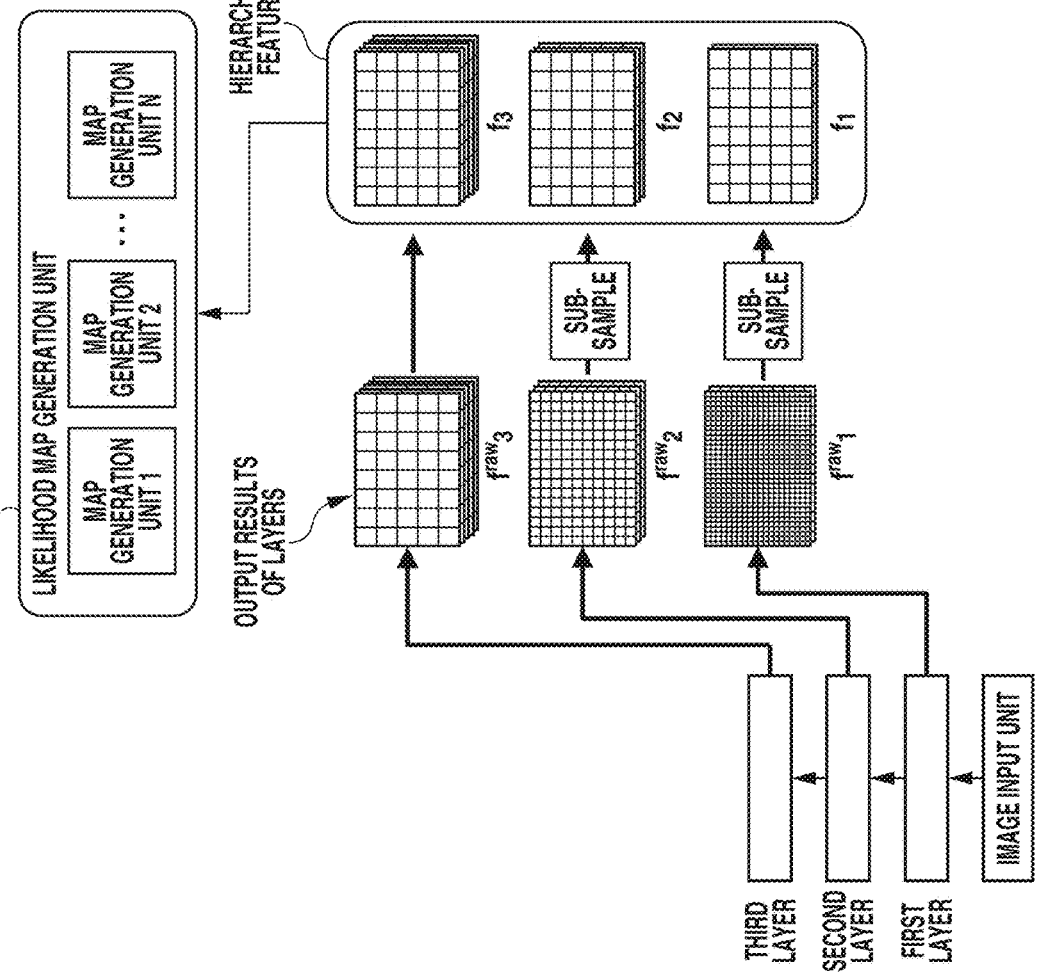

FIGS. 12A and 12B are schematic diagrams illustrating processes of extracting an image feature. FIG. 12A is a diagram illustrating the form of the process of extracting an image feature in the above descriptions. The output results of the hierarchical layers of a neural network are joined together, thereby generating and using the following hierarchical feature of a single type.

$$F(x,y)=[f_1(x,y)^T, f_2(x,y)^T, f_3(x,y)^T]^T$$

FIG. 12B illustrates a form of a process of extracting an image feature according to the present exemplary embodiment. An aggregate method for generating a hierarchical feature is changed in N ways, thereby generating N features as follows.

$$F_k(x,y)=[f_{k1}(x,y)^T, f_{k2}(x,y)^T, f_{k3}(x,y)^T]^T (k=1,2,\ldots,N)$$

Figure 13:
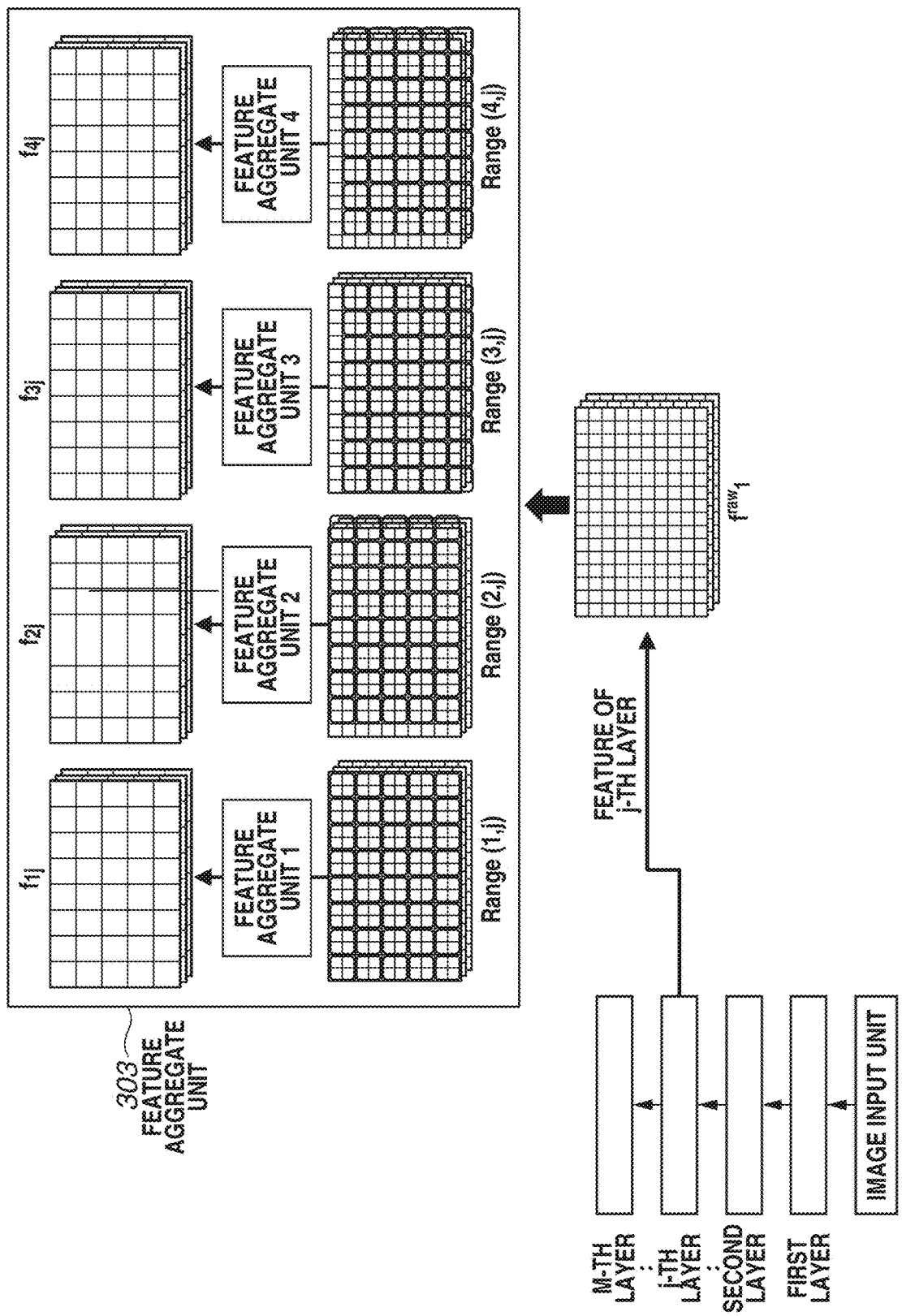
FIG. 13 is details of the aggregate of the features.

FIG. 13 illustrates a specific example of an aggregate method. In FIG. 13, a feature aggregate unit 303 sub-samples a feature $f^{raw}_j$ output from a j-th layer of a CNN in four ways, thereby generating four image features $f_{1j}$ to $f_{4j}$. Thus, a different image feature is input with respect to each model. Although the vertical and horizontal resolution of a feature map is halved by the sub-sampling in this case, the sub-sampling is performed while changing the phase of a region block range (Range(k, j)) of 2×2 each time. With this operation, the image features are features $f_{kj}$ having subtly different variations.

Figure 14:
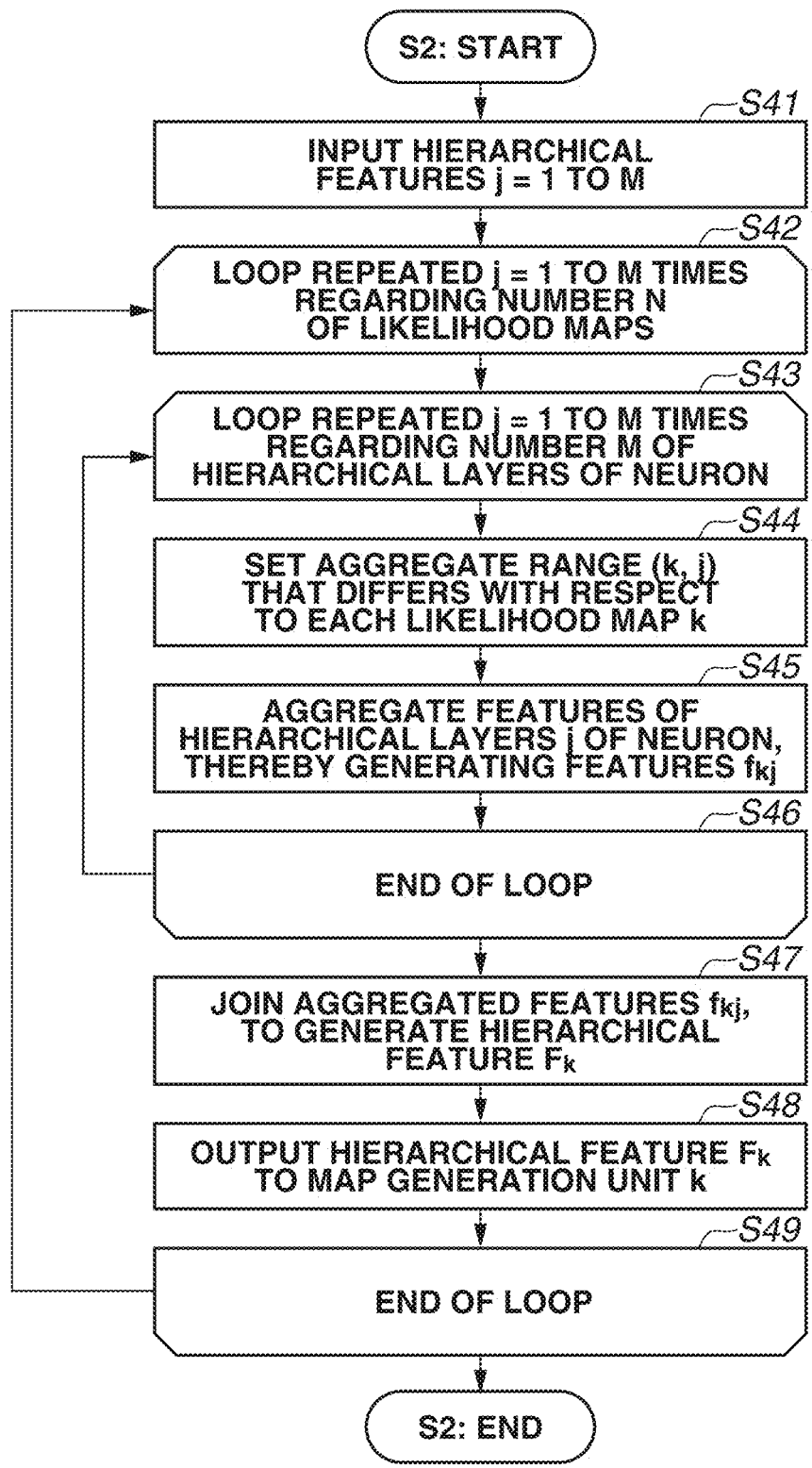
FIG. 14 is a flowchart illustrating processing executed by the information processing apparatus.

FIG. 14 particularly illustrates a detailed flow of an image feature extraction part (corresponding to step S2 in the first exemplary embodiment) in the flow of processing according to the second exemplary embodiment. In this flow, in a loop of steps S42 to S49, the feature aggregate unit 303 aggregates and generates N image features. In steps S43 to S46, the feature aggregate unit 303 sets an aggregate range Range(k, j) that differs depending on a number k of a likelihood map (step S44), and performs sub-sampling in the aggregate range Range(k, j), thereby generating features $f_{kj}$ (step S45). Further, in step S47, the feature aggregate unit 303 joins the features $f_{kj}(x, y)$, thereby generating a hierarchical feature $F_k(x, y)$. Then, in step S48, the feature aggregate unit 303 outputs the hierarchical feature $F_k(x, y)$ to a likelihood map generation unit k.

The aggregate pattern of sub-sampling is thus changed in various manners, whereby it is possible to provide subtly different features (e.g., different in phase) to a plurality of likelihood map generation units. Since the likelihood scores of objects are determined based on different features, the possibility that object patterns located close to each other can be separated and detected is higher than in the determination based on a single feature. As a similar method, it is also possible that a high-resolution input image is processed by the neural network 102a, thereby obtaining and using an image feature having a high resolution. However, this method involves an increase in the amount of calculation of the neural network 102a. Since the method for aggregating features is merely changed in the form of the present exemplary embodiment, it is possible to obtain a similar effect without particularly increasing the amount of calculation.

The above form is an example form, and the aggregate method can be changed in another manner. Alternatively, instead of 2×2, a non-square range such as 1×2 or 2×1 may be used. Yet alternatively, in addition to sub-sampling, maximum pooling or average sampling may be performed. Yet alternatively, using a partially branched DNN, feature maps of layers partially different from each other for each feature may be joined together. Further, although a hierarchical image feature is used as the base feature of the neural network in this case, an applicable form is not limited to this.

When learning is performed, similar to the first exemplary embodiment, loss values may be calculated, and weights may be updated by the error backpropagation method.

Figure 15:
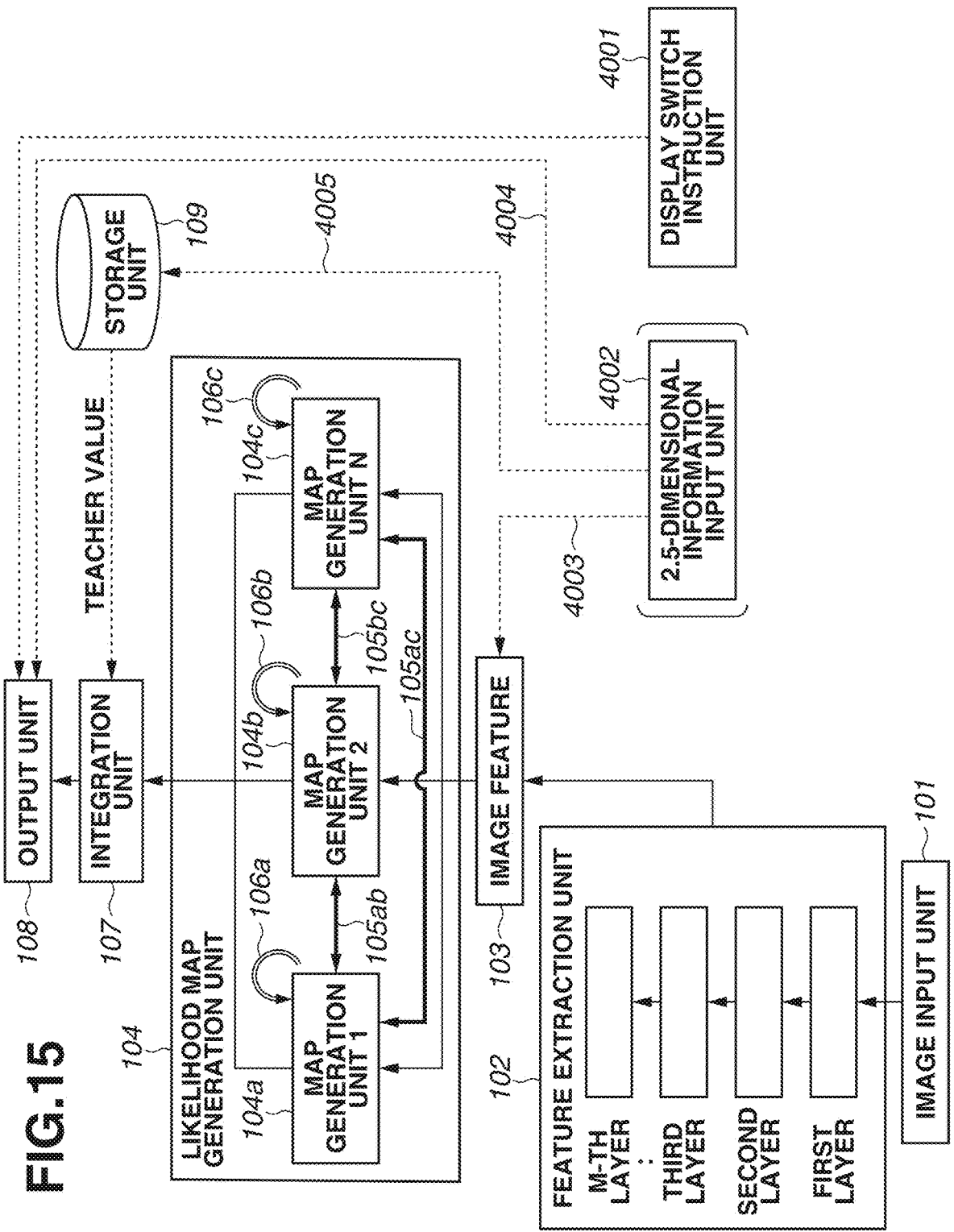
FIG. 15 is a block diagram illustrating an example of a functional configuration of an information processing apparatus.

In a third exemplary embodiment, a description is given of a form in which as one of information input units for providing inputs to an information processing apparatus according to the present exemplary embodiment, distance information regarding an image (hereinafter, "2.5-dimensional information") is added and used. Further, a description is given of a form in which a display switch instruction unit that receives an instruction from a user is provided, and the manner of presenting a recognition result is switched based on the intervention of the user. FIG. 15 is a block diagram illustrating a functional configuration. As the hardware configuration of the information processing apparatus, similar to the first exemplary embodiment, the configuration as illustrated in FIG. 21 is used.

As usage cases of the 2.5-dimensional information, two types of cases used when learning is performed and used when targets are recognized, are possible.

<Use of 2.5-Dimensional Information when Learning is Performed>

An example of the usage case of the 2.5-dimensional information when learning is performed is as follows. As illustrated in a flowchart of a processing flow in FIG. 9B, first in step S33, a map of the observed 2.5-dimensional information is given as a type of true value. The map of the 2.5-dimensional information is represented as a variable Dist(x, y, d). In this case, for simplicity, the map Dist(x, y, d) of the 2.5-dimensional information is a three-dimensional matrix having the same image resolution as that of a likelihood map (a depth direction d is discretized in advance as d=0, 1, . . . , $d_N$. $d_n$ is an appropriate value corresponding to the maximum distance.). Among the elements of the matrix Dist, elements corresponding to the position and the depth where an object is present are set to 1, and other elements are set to 0. Next, in step S36, a 2.5-dimensional value is used in the calculation of a loss value in each map as in the following formula.

$$\text{Loss}^{INTRA}(x,y) = -\Sigma_k \Sigma_{\Delta x, \Delta y, \Delta d \in R} \xi'(\Delta x, \Delta y, \Delta d) \times v'_k(x+\Delta x, y+\Delta y, d+\Delta d) \times \text{Dist}(x+\Delta x, y+\Delta y, d+Ad) \quad \text{<Mathematical Formula 19>}$$

In mathematical formula 19, $\xi'$ is the following function obtained by expanding the Mexican hat function in the depth direction.

$$\xi'(x,y) := \psi_1 \exp(-(x^2+y^2+\kappa d^2)/\rho_1) - \psi_2 \exp(-(x^2+y^2+\kappa d^2)/\rho_2) \quad (\kappa \text{ is a constant for adjusting the scale}) \quad \text{<Mathematical Formula 20>}$$

$v'_k(x, y, d)$ is a variable obtained by duplicating the likelihood score $v_k(x, y)$ of the likelihood map in the depth direction and expanding the likelihood score $v_k(x, y)$ in three dimensions for convenience.

$$(v'_k(x,y,d) := v_k(x,y), d=0,1,\ldots,d_N)$$

The above-described formula means that a penalty is imposed on detecting, on a single likelihood map, objects located close to each other in both the distance on the image plane of the image and the distance in depth. Learning is performed using this loss value, thereby leading the likelihood maps to dispersedly respond to objects close to each other in the distance in depth and distance on the image plane, as much as possible.

As a derived form similarly using the distance information, a form is also possible in which a loss value is calculated to impose a penalty in a case of detecting an object on the near side on a great-numbered likelihood map and detecting an object on the far side on a small-numbered likelihood map. However, it should be noted that in a case where many objects greatly exceeding the number of maps are arranged in a line in a rod-like manner (this can frequently occur in a group photograph), and if learning is performed while closely associating the distance and the likelihood maps with each other, on the contrary, the degree of separation of detection of objects deteriorates. It is considered that a method for using the distance information relatively as in the form of mathematical formula 19 in the present exemplary embodiment is more suitable in the disclosure.

<Use of 2.5-Dimensional Information when Targets are Recognized>

As a form of using the distance information when targets are recognized, a map of the 2.5-dimensional information is joined as one of image features and used for the recognition.

Another form is a form in which when targets are recognized, a display switch instruction unit 4001 as an user instruction unit is used to switch display based on an instruction from the user and the distance information.

Figure 16:
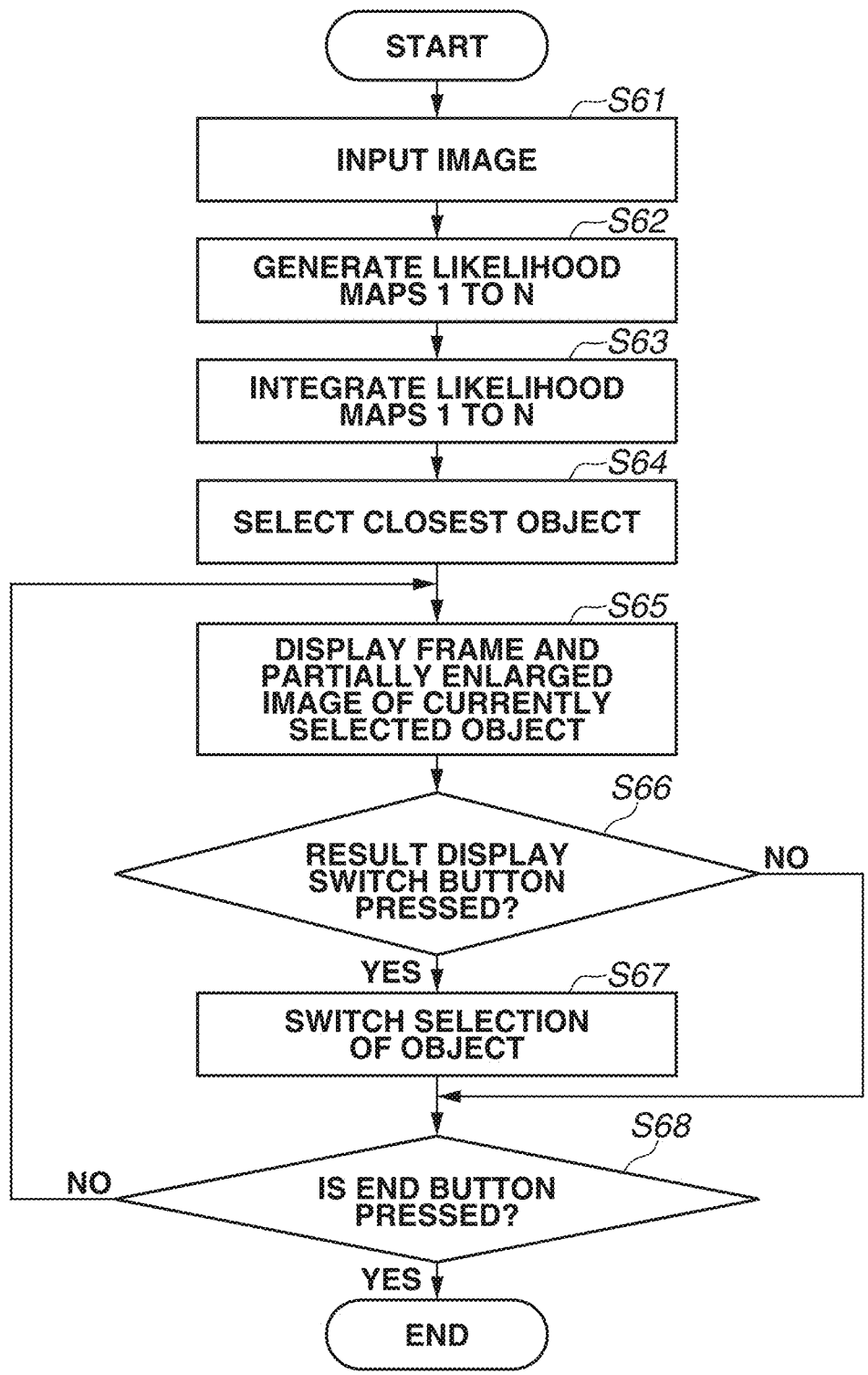
FIG. 16 is a flowchart illustrating processing executed by the information processing apparatus.

The details of the second form are described. With reference to a flowchart in FIG. 16 and a diagram in FIG. 17, a description is given using an input image 1700a and images 1700b to 1700f as examples of display of results in FIG. 17. First, in step S61, if a recognition process is started, the image 1700a is input. Next, in step S62, likelihood maps are generated. Next, in step S63, the likelihood maps are integrated together, thereby obtaining, as an example, the results of detection frames as in the image 1700b. If these results are displayed as they are, the visibility is low. Thus, in step S64, as a possible user interface, the closest object among detected objects is determined using the distance information input from a 2.5-dimensional information input unit 4002, and the detection frame of the determined object is displayed. In step S65, simultaneously, the result of enlarging the detection frame is also displayed in an enlarged display window 302a. The image 1700c illustrates an example of the result. Next, in steps S66 and S67, the user gives an instruction using left and right arrow buttons 301a as an example form of the display switch instruction unit 4001, thereby switching the display. At this time, a form is possible in which in response to the pressing of the left and right arrow buttons 301a by the user, the objects are displayed in a state of switching the results in order of left/right positions of the objects. The image 1700d illustrates an example of the thus switched display. A form is also possible in which the objects are displayed in a state of switching the objects in order of distance. A form is also possible in which the user instruction unit is not used, and the display is automatically switched every certain time.

As a derived form, a form is also possible in which the detection frames as described above are not displayed, but the likelihood score values of the likelihood maps are displayed as a grayscale map. It is possible that the values of maps are thus displayed in response to an instruction from the user, thereby being used as an interface presenting information regarding the internal state of the recognition result of a neural network. The image 1700e illustrates an example of the result. In this case, the likelihood score values of the likelihood maps are indicated by rectangles in gray to black according to the magnitudes of the values. The image 1700f illustrates an example where the user further gives an instruction by pressing left and right arrow buttons 301b, and the results of the likelihood maps to be displayed are displayed by switching the results. In the images 1700e and 1700f, the likelihood scores of two different likelihood maps are displayed in a state of switching the likelihood scores. Thus, it should be noted that overlapping regions are present in some of the shades of the likelihood score values, and the values displayed on the images 1700e and 1700f are different from each other (e.g., rectangles 303). Although all the likelihood score values of the likelihood maps are displayed as they are in this case, it is also possible that the detection results and the 2.5-dimensional information are used in combination, thereby separately displaying the likelihood score values for each detected object. With this function, the user can confirm that the learning of trained models is sufficiently advanced, and objects are accurately detected.

In a fourth exemplary embodiment, a description is given of an information processing apparatus that semantically segments an image. The present exemplary embodiment is to show that the disclosure is not only applicable to an object detection task with respect to each object, but also widely applicable to various tasks such as a region labeling task.

It is generally difficult to correctly identify and separate the regions of objects overlapping or close to each other. To this end, K. He, G. Gkioxari, P. Dollar, R. Girshick, Mask R-CNN, ICCV, 2017 discusses a technique in which, first, an object in an image is detected, and the processing of a DNN is performed again using an identified object region as an input. Then, it is distinguished whether each pixel is the foreground, thereby generating a foreground region of the object. This method segments a region with high accuracy, but performs the processing of the DNN for each object, and therefore requires a large amount of calculation.

The information processing apparatus according to the present exemplary embodiment does not perform the processing of a DNN with respect to each object. In K. He, G. Gkioxari, P. Dollar, R. Girshick, Mask R-CNN, ICCV, 2017, a map for distinguishing a foreground region is prepared with respect to each object. However, in the present exemplary embodiment, N likelihood maps are used (it is assumed that the number N of maps is smaller than the number of target objects simultaneously appearing in an image). Hereinafter, these maps will be referred to as "region likelihood maps". The present exemplary embodiment is intended to identify the region of an object as an object region. Further, the present exemplary embodiment is intended to, regarding a plurality of objects, separate and identify the region of each object.

<Learning Operation>

Figure 20:
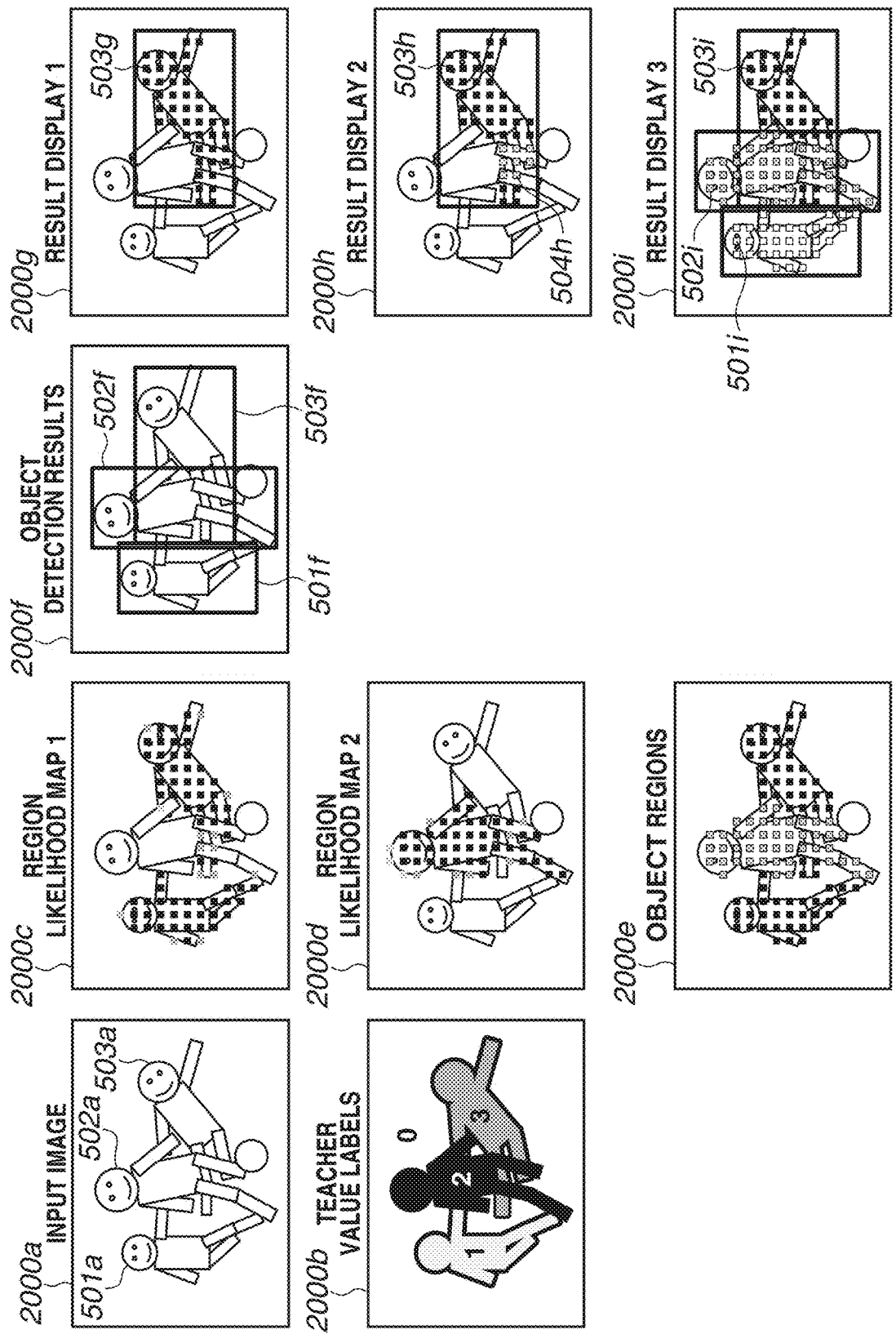
FIG. 20 is a diagram illustrating examples of likelihood maps.

FIG. 20 illustrates examples of an input image, likelihood maps, and a teacher image according to the fourth exemplary embodiment. A description is given with reference to images 2000a to 2000i. When learning is performed, as in the image 2000b, $l(x, y) \in \{0, 1, \ldots, L\}$, which is the true value of the label of each region, is prepared as a teacher value. In FIG. 20, the differences between the values of the labels are represented by the differences between the colors of object regions. A region block where the label l(x, y) is 0 is a region where no object is present. Region where the label l(x, y) are 1, 2, ..., L are object regions, and different numerical values mean different objects in the image. Region information indicating the region of each object is teacher data according to the present exemplary embodiment. More specifically, the teacher value is image information having a label indicating which object is present at each pixel (e.g., 1 for a person on the left, 2 for a person at the center, 3 for a person on the left, and 0 for a region where a person is not present).

Each region likelihood map learns weight parameters so that a great likelihood score value is obtained in an object region (l(x, y)>0), and a small likelihood score is obtained in another region (l(x, y)=0). A loss function to be used may be cross entropy similar to that in the object detection task according to the first exemplary embodiment. Specifically, for example, mathematical formulas 8 and 9 according to the first exemplary embodiment are used. In the object detection task according to the first exemplary embodiment, learning is performed in a state of giving a positive teacher value to a region block at the center of an object. In this region distinction task, learning is performed in a state of giving a positive teacher value to all blocks corresponding to the region of an object.

As a form for achieving a method in which <a plurality of likelihood maps recognizes targets in a dispersed cooperative manner>, which is the characteristic of the aspect of the embodiments, terms of loss functions for achieving the following two properties are further added.

(1) A single region likelihood map does not simultaneously respond to a plurality of object regions close to or overlapping each other (2) A plurality of region likelihood maps does not simultaneously respond to a region of a same object First, a loss function for achieving the above (1) is described. Although various forms are possible, this loss function is obtained by the following formula, for example.

$$Loss^{INTRA} = \Sigma_k \Sigma_{xy} \Sigma_{\Delta x, \Delta y \in R} \{1 - \delta(l(x,y) - l(x+\Delta x, y+\Delta y))\} \times v_k(x,y) \times v_k(x+\Delta x, y+\Delta y)$$ <Mathematical Formula 21>

The above loss function imposes a penalty of a loss value in a case where a single region likelihood map responds to the regions of a plurality of different objects. δ is a Dirac delta function, which returns 1 if the labels of two regions have a same value, and returns 0 if the labels of two regions have different values. $v_k$ is a likelihood score value of an object region on a k-th region likelihood map. R is a range of a predetermined near block for preventing simultaneous responses. Outside this range, a penalty is not imposed even if a region likelihood map responds to the regions of different objects.

Next, a loss function for achieving the property of the above (2) can be achieved using mathematical formula 16 in the first exemplary embodiment.

Using the above loss functions, parameters as learning targets are learned and updated to decrease the sum of the loss values. If the learning advances, a region likelihood map correctly responds to the region of an object, and the regions of a plurality of objects close to or overlapping each other are detected as dispersedly as possible on a plurality of different region likelihood maps.

<Recognition Operation>

Figure 18:
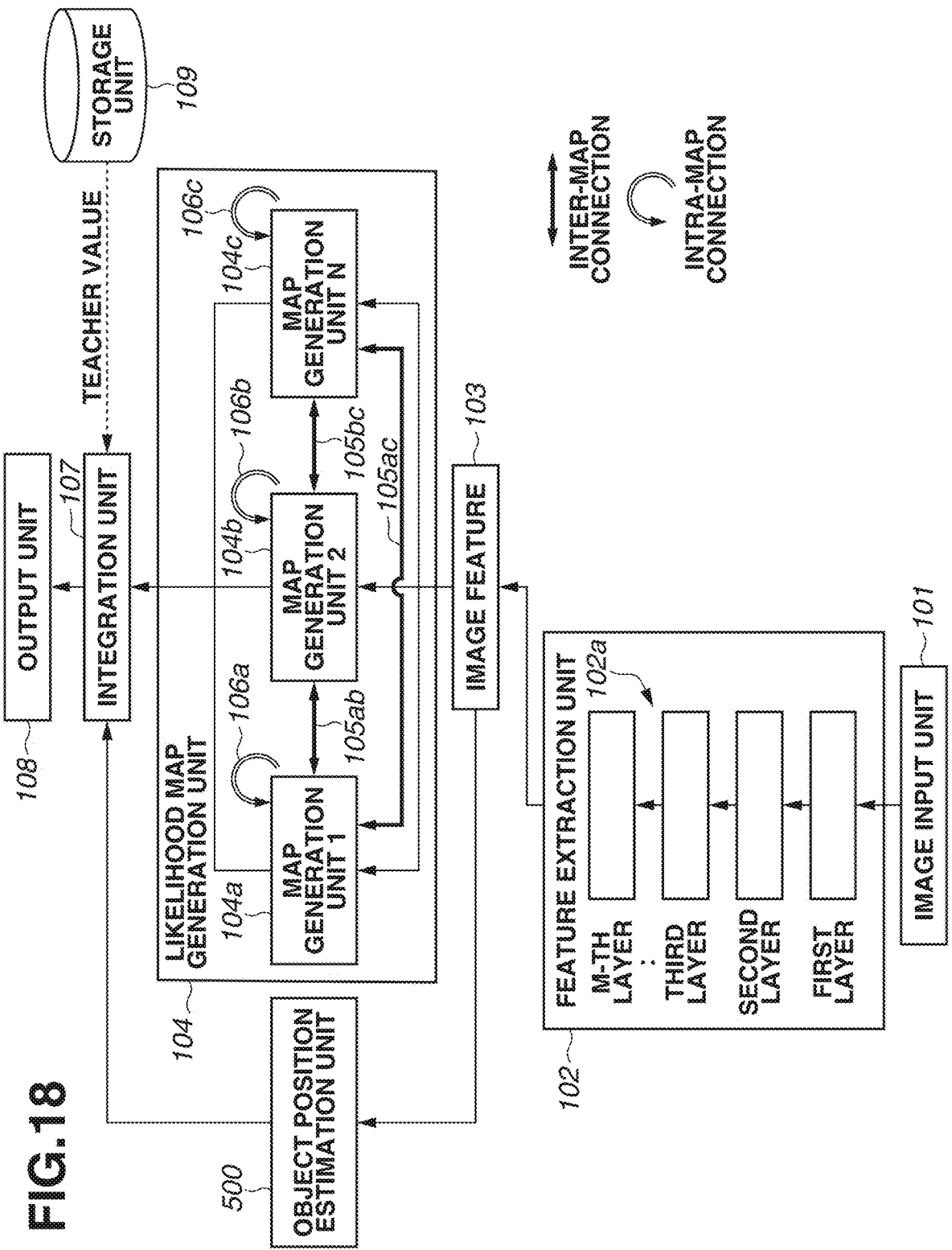
FIG. 18 is a block diagram illustrating an example of a functional configuration of an information processing apparatus.
Figure 19:
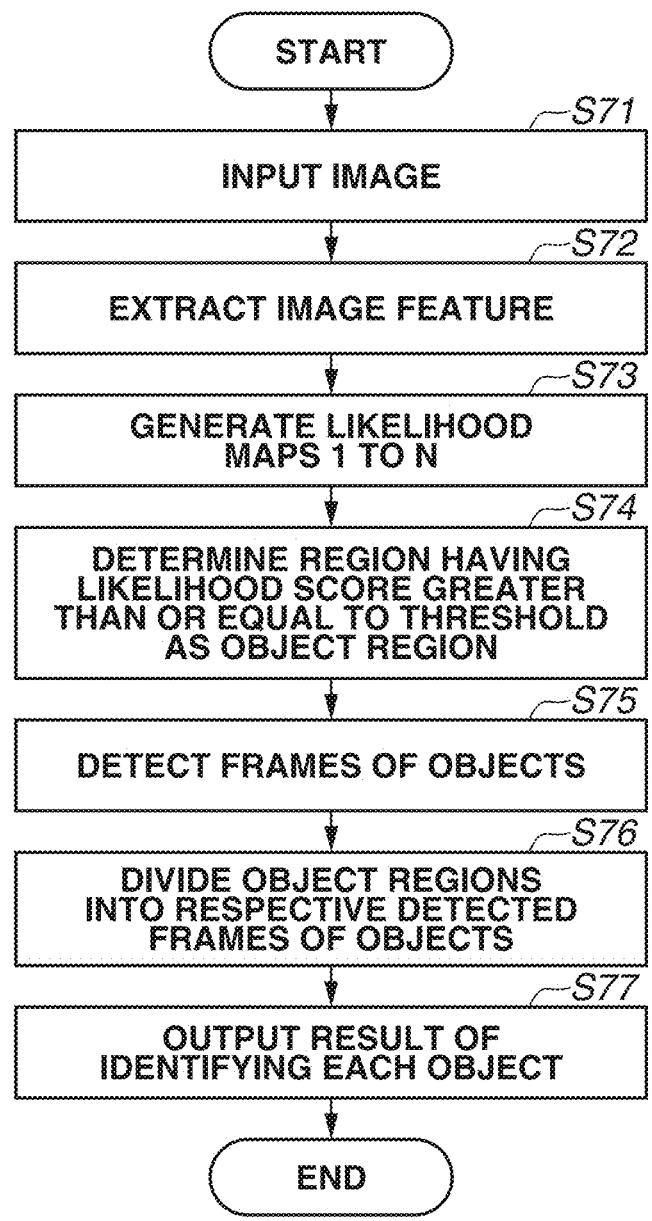
FIG. 19 is a flowchart illustrating processing executed by the information processing apparatus.

FIG. 18 is a block diagram of an example of a functional configuration of the information processing apparatus that generates region likelihood maps. The basic configuration of the information processing apparatus is almost the same as that according to the first exemplary embodiment. Modules for performing the same processes are designated by the same numbers. First, the present exemplary embodiment is different from the first exemplary embodiment in that an object position estimation unit 500 is newly added. Second, the present exemplary embodiment is different from the first exemplary embodiment in that a target to be detected by the likelihood map generation unit 104 and the integration unit 107 is the center position of an object (first exemplary embodiment) or a foreground region of an object (present exemplary embodiment). FIG. 19 is a flowchart illustrating this processing. FIG. 20 illustrates examples of processes and results of the processing. As the hardware configuration of the information processing apparatus, similar to the first exemplary embodiment, the configuration as illustrated in FIG. 21 is used.

The flow of a recognition process using region likelihood maps is briefly described. In step S71, similar to the above exemplary embodiments, first, the image input unit 101 of the information processing apparatus inputs an input image as a recognition target. Next, in step S72, the feature extraction unit 102 extracts an image feature 103 from the input image 2000a. In step S73, the likelihood map generation unit 104 composed of a plurality of region likelihood maps generates maps each having a likelihood score indicating whether a block is a region block of a target object. The image 2000c illustrates an example of the result of a region likelihood map 1. The image 2000d illustrates an example of the result of a region likelihood map 2. In FIG. 20, the magnitude of the likelihood score value is displayed as a rectangle in grayscale (the darker the rectangle is, the higher the score is). Trained models to be used by the likelihood map generation unit 104 are trained in advance so that objects close to each other are detected dispersedly on different maps. The method will be described below.

In steps S74 to S76, the process of integrating the region likelihood maps is performed. First, in step S74, the integration unit 107 determines a region block including a likelihood score value greater than or equal to a predetermined threshold as the region of an object. The image 2000e illustrates examples of regions determined as regions where objects are present. In this case, regions determined as regions where objects are present in the region likelihood map 1 are indicated by black rectangles, and a region where an object is similarly detected in the region likelihood map 2 is indicated by gray rectangles. In this case, a portion determined as an object region in both the region likelihood maps 1 and 2 is indicated by the color in the map having the higher likelihood score value. Thus, an object region map in the image 2000e is a map indicating the position where a likelihood greater than or equal to a threshold is detected for each region likelihood map, not the above-described map color-coded according to the magnitude of the likelihood.

Next, in step S75, the object position estimation unit 500 detects the position of an object and provides information regarding the position of the object to the integration unit 107. As a method for detecting an object, the method discussed in the first exemplary embodiment or J. Redmon, A. Farhadi, YOLO9000: Better, Faster, Stronger, CVPR, 2017 is separately performed. In the present exemplary embodiment, objects are detected based on the image feature 103 using the method according to the first exemplary embodiment. In the image 2000f, examples of detection frames 501f to 503f is illustrated for detected objects.

Next, in step S76, the integration unit 107 divides the regions where the objects are present into the regions of the individual objects. As a method, first, the detection frames and the region likelihood maps are associated with each other. In this case, a region likelihood map having the greatest number of regions determined to be objects among regions in each frame is associated with the frame. For an example, the detection frame 503f in the image 2000f is associated with the region likelihood map 1. Next, an object region on a region likelihood map associated with each detection frame is determined to be the region of each object (e.g., a region 503g in the image 2000g).

Finally, in step S77, the output unit 108 outputs the result indicating the region where each object is present. For example, as in the image 2000g, the object region 503g may be displayed for each object. At this time, in a region where a plurality of objects overlaps each other (e.g., a gray rectangular region 504h in the image 2000h), using the magnitudes of the likelihood score values of the region likelihood maps or the 2.5-dimensional information, it may be estimated whether each object is on the front side or the back side. In this case, a covered region may be displayed by changing its color as in the rectangular region 504h. Further, as in the image 2000i, the objects may be displayed by superimposing all the object regions and changing the color of the region of each object. Similar to the third exemplary embodiment, a user instruction unit for switching these types of display may be included.

For the integration of the region likelihood maps, various pieces of detailed derivative ingenuity are possible in addition to the above descriptions. For example, not the number of object regions, but the magnitudes of the likelihood score values may be used to determine associations. Alternatively, using the 2.5-dimensional information, regions are associated from the detection frame of an object on the front side. Yet alternatively, an associated region is removed, and an overlapping region is accurately associated. Yet alternatively, regions are associated from a frame having high purity (little mixed with another map) in a region likelihood map. Further, a simple method of, without using the detection frames of objects, determining isolated object regions in a region likelihood map as the regions of separate objects is also possible. It should be noted that there is a possibility that a covered object is excessively divided into a plurality of regions. As described above, methods in various forms are possible, but have superficial differences not related to the foundation of the aspect of the embodiments, and therefore are not described in detail here.

As described above, the aspect of the embodiments is applicable not only to the object detection task, but also to the region distinction task. Particularly, a plurality of region likelihood maps is simultaneously used, whereby the aspect of the embodiments is suitable for a case where objects of the same type are close to or overlap each other. This is a form different from a method for detecting objects and then determining a region with respect to each object using a DNN, which requires a large amount of calculation, as discussed in K. He, G. Gkioxari, P. Dollar, R. Girshick, Mask R-CNN, ICCV, 2017.

The aspect of the embodiments can be achieved also by performing the following process. This is the process of supplying software (program) for achieving the functions of the above-described exemplary embodiments to a system or an apparatus via a network for data communication or various storage media, and of causing a computer (or a CPU or a microprocessor unit (MPU)) of the system or the apparatus to read and execute the program. A computer-readable recording medium that records the program may be provided.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-233229, filed Dec. 24, 2019, which is hereby incorporated by reference herein in its entirety.

What is claimed is:

1. An information processing apparatus comprising:
at least one processor; and
a memory coupled to the at least one processor, the memory having instructions that, when executed by the processor, causes the at least one processor to function as:
a first acquisition unit configured to acquire, for an input image, a plurality of likelihood maps by setting a plurality of different weight parameters to a trained model; and
a detection unit configured to detect, based on the acquired plurality of the likelihood maps, the position of the object,
wherein the trained model learns the weight parameters based on loss values acquired using at least one of
a first loss function for reducing a likelihood around a position of interest in the likelihood map, and
a second loss function for increasing a likelihood acquired at the position of the object in the input image,
wherein the trained model is a model that has learned the weight parameters based on a loss value acquired using the second loss function for outputting the loss value so that the loss value for a position on the likelihood map corresponding to the position of the object is greater, in a case where a likelihood obtained by integrating the plurality of the likelihood maps is smaller than a predetermined value at the position of the object in the input image.

2. The information processing apparatus according to claim 1, wherein the trained model learns the weight parameters further based on a loss value acquired using a third loss function for making positions each indicating a likelihood greater than a predetermined value different between two likelihood maps among the plurality of the likelihood maps.

3. The information processing apparatus according to claim 2, wherein the trained model is a model that has learned the weight parameters based on a loss value acquired using the third loss function for adjusting a likelihood estimated at the position of interest in at least one of the likelihood maps, based on a likelihood estimated at a position of interest common to the two predetermined likelihood maps.

4. The information processing apparatus according to claim 1, wherein the trained model is a model that has learned the weight parameters based on a loss value acquired using the first loss function for reducing a likelihood at a position around the position of interest so that the smaller a difference between a likelihood at the position of interest and the likelihood at the position around the position of interest is, the smaller the likelihood at the position around the position of interest is.

5. The information processing apparatus according to claim 1, wherein the trained model is a model that has learned the weight parameters based on a loss value acquired using the first loss function for outputting the loss value so that the smaller a difference between a likelihood at the position of interest and a likelihood at a position around the position of interest is, the greater the loss value for the position around the position of interest is.

6. The information processing apparatus according to claim 1, wherein the trained model is a model that has learned the weight parameters based on a loss value acquired using the second loss function for adjusting a likelihood obtained by integrating the plurality of the likelihood maps to be greater than a predetermined value at the position of the object in the input image.

7. The information processing apparatus according to claim 1, wherein the at least one processor further functions as:
a second acquisition unit configured to acquire the position of the object included in the input image; and
a learning unit configured to learn the weight parameters in the trained model, based on the position of the object acquired by the second acquisition unit and a plurality of loss functions,
wherein the plurality of loss functions at least includes the first and second loss functions.

8. The information processing apparatus according to claim 7, wherein the learning unit learns the weight parameters in the trained model further based on a third loss function for making positions each indicating a likelihood greater than a predetermined value different between two likelihood maps among the plurality of the likelihood maps.

9. The information processing apparatus according to claim 8,
wherein the second acquisition unit acquires a number of the objects in the input image, and
wherein the learning unit learns the weight parameters based on a loss value acquired using the second loss function for outputting a greater loss value in a case where the acquired number does not coincide with a number of positions at which likelihoods acquired from a result of integrating the plurality of the likelihood maps are greater than a predetermined value.

10. The information processing apparatus according to claim 9, wherein the learning unit learns the weight parameters based on a loss value acquired using the second loss function for, based on the number of the objects acquired by the second acquisition unit, in a case where there is a single position of the object included in the input image, a likelihood at the position of the object on any one of the plurality of the likelihood maps to be greater, and in a case where there is a plurality of positions of the objects included in the input image, adjusting a number of the likelihood maps on which a likelihood at the position of the object is greater corresponding to the number of the objects, to increase.

11. The information processing apparatus according to claim 1, wherein the first acquisition unit acquires the plurality of the likelihood maps by inputting, among image features extracted from the input image, combinations of image features different for each of the plurality of different weight parameters to the trained model.

12. The information processing apparatus according to claim 1, wherein the at least one processor further functions as an extraction unit configured to extract image features in a plurality of different combinations from the input image,
wherein the first acquisition unit acquires the plurality of the likelihood maps by inputting, among the extracted image features, combinations of image features different for each of the plurality of different weight parameters to the trained model.

13. The information processing apparatus according to claim 1, wherein the at least one processor further functions as a third acquisition unit configured to acquire distance information indicating a distance between the object and a sensor,
wherein the first acquisition unit acquires the plurality of the likelihood maps by further inputting the distance information to the trained model.

14. The information processing apparatus according to claim 1, wherein the at least one processor further functions as a specifying unit configured to specify a number of the objects based on the image feature extracted from the input image,
wherein the first acquisition unit acquires likelihood maps as many as the specified number of the objects.

15. The information processing apparatus according to claim 1, wherein the at least one processor further functions as an update unit configured to update the plurality of the likelihood maps acquired by the first acquisition unit,
wherein the update unit determines a first adjustment value for reducing a likelihood around a position of interest in the likelihood map, and updates a likelihood estimated on the likelihood map.

16. The information processing apparatus according to claim 15, wherein the update unit determines a second adjustment value for making positions each indicating a likelihood greater than a predetermined value different between two likelihood maps among the plurality of the likelihood maps, and updates a likelihood estimated on the likelihood map.

17. An apparatus that detects a position of an object included in an input image, the apparatus comprising:
at least one processor; and
a memory coupled to the at least one processor, the memory having instructions that, when executed by the processor, causes the at least one processor to function as:
a first acquisition unit configured to acquire a plurality of likelihood maps by setting a plurality of different weight parameters in a trained model that outputs, with an image feature extracted from the input image as an input, a likelihood map that estimates, for each region in the input image, a likelihood indicating a possibility that the object is present; and
a detection unit configured to, based on the acquired plurality of the likelihood maps, detect the position of the object included in the input image,
wherein the trained model is a model that has learned the weight parameters based on loss values at least acquired using
a first loss function for reducing a likelihood around a position of interest in the likelihood map, and
a second loss function for outputting the loss value so that the loss value for a position on the likelihood map corresponding to the position of the object is greater, in a case where a likelihood obtained by integrating the plurality of the likelihood maps is smaller than a predetermined value at the position of the object in the input image.

18. A non-transitory storage medium that stores a program for causing a computer to execute a method, the method comprising:
acquiring, for a input image, a plurality of the likelihood maps by setting a plurality of different weight parameters to a trained model; and
detecting the position of the object included in the input image, based on the acquired plurality of the likelihood maps,
wherein the trained model is a model that has learned the weight parameters based on loss values acquired using at least one of
a first loss function for reducing a likelihood around a position of interest in the likelihood map, and
a second loss function for increasing a likelihood acquired at the position of the object in the input images,
wherein the trained model is a model that has learned the weight parameters based on a loss value acquired using the second loss function for outputting the loss value so that the loss value for a position on the likelihood map corresponding to the position of the object is greater, in a case where a likelihood obtained by integrating the plurality of the likelihood maps is smaller than a predetermined value at the position of the object in the input image.

19. A method for detecting a position of an object included in an input image, the method comprising:
acquiring, for an input image, a plurality of the likelihood maps by setting a plurality of different weight parameters to a trained model; and
detecting the position of the object included in the input image, based on the acquired plurality of the likelihood maps,
wherein the trained model is a model that has learned the weight parameters based on loss values acquired using at least one of
a first loss function for reducing a likelihood around a position of interest in the likelihood map, and
a second loss function for increasing a likelihood acquired at the position of the object in the input image,
wherein the trained model is a model that has learned the weight parameters based on a loss value acquired using the second loss function for outputting the loss value so that the loss value for a position on the likelihood map corresponding to the position of the object is greater, in a case where a likelihood obtained by integrating the plurality of the likelihood maps is smaller than a predetermined value at the position of the object in the input image.

* * * * *